(12) United States Patent
Nagano et al.

(10) Patent No.: US 7,694,602 B2
(45) Date of Patent: Apr. 13, 2010

(54) AUTOMATIC TRANSMISSION APPARATUS AND AUTOMATIC TRANSMISSION METHOD FOR VEHICLE

(75) Inventors: Masaharu Nagano, Fukaya (JP); Yuzou Shimamura, Hikigun Kawajima-machi (JP); Yukitsugu Hirota, Kamakura (JP); Hitoshi Kidokoro, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 498 days.

(21) Appl. No.: 11/631,502

(22) PCT Filed: Jul. 7, 2005

(86) PCT No.: PCT/JP2005/012559
§ 371 (c)(1),
(2), (4) Date: Jan. 24, 2007

(87) PCT Pub. No.: WO2006/004183
PCT Pub. Date: Jan. 12, 2006

(65) Prior Publication Data
US 2008/0016978 A1 Jan. 24, 2008

(30) Foreign Application Priority Data
Jul. 7, 2004 (JP) ............................... 2004-200086

(51) Int. Cl.
*B60K 17/04* (2006.01)
(52) U.S. Cl. .................... 74/473.12; 74/335; 74/473.21
(58) Field of Classification Search .................. None
See application file for complete search history.

(56) References Cited

U.S. PATENT DOCUMENTS

| 6,332,524 | B1  |   | 12/2001 | Shin |
| 6,536,297 | B2  | * | 3/2003  | Yamamoto .................... 74/335 |
| 6,904,823 | B2  | * | 6/2005  | Levin et al. ............. 74/471 XY |
| 7,013,748 | B2  | * | 3/2006  | Satoh et al. ............... 74/473.12 |
| 7,174,801 | B2  | * | 2/2007  | Ogasawara et al. ......... 74/473.3 |
| 7,194,927 | B2  | * | 3/2007  | Kozu et al. ............... 74/473.12 |

(Continued)

FOREIGN PATENT DOCUMENTS

JP         10-246329 A         9/1998

(Continued)

*Primary Examiner*—Roger L Pang
*Assistant Examiner*—Justin Holmes
(74) *Attorney, Agent, or Firm*—Foley & Lardner LLP

(57) ABSTRACT

An automatic transmission apparatus (1) for a vehicle includes: a shift lever (11) for changing the range of an automatic transmission (50); a position gate (13) which restricts the position of the shift lever (11) and which releases the restriction to allow the position of the shift lever (11) to be changed when an operation button (14) provided on the shift lever (11) is pressed; a torque sensor (30) which detects an operation force of the shift lever (11); and a motor (M) for power-assisting the operation of the shift lever (11) based on a detected value of the torque sensor (30), wherein, when the shift lever (11) is operated and brought into contact with the position gate (13), and the detected value of the torque sensor (30) is reversed to any one of a positive value and a negative value, a driving force of the motor (M) is limited to prevent the shift lever (11) from being power-assisted in a reversed direction.

17 Claims, 17 Drawing Sheets

U.S. PATENT DOCUMENTS

| | | | |
|---|---|---|---|
| 7,412,908 B2 * | 8/2008 | Hedman | 74/335 |
| 2002/0000133 A1 | 1/2002 | Yamamoto | |
| 2004/0016314 A1 | 1/2004 | Satoh et al. | |
| 2004/0123693 A1 * | 7/2004 | Ogasawara et al. | 74/473.1 |
| 2005/0139030 A1 * | 6/2005 | Shimamura et al. | 74/473.12 |
| 2005/0151492 A1 * | 7/2005 | Nakai et al. | 318/432 |

FOREIGN PATENT DOCUMENTS

| | | |
|---|---|---|
| JP | 2001-021037 A | 1/2001 |
| JP | 2002-013634 A | 1/2002 |
| JP | 2003-156144 A | 5/2003 |
| JP | 2003-301942 A | 10/2003 |

* cited by examiner (A) P→L ASSIST (B) L→P ASSIST

▧ ASSIST CONTROL
▨ BRAKE CONTROL
☐ MOTOR STOP

AUTOMATIC TRANSMISSION APPARATUS AND AUTOMATIC TRANSMISSION METHOD FOR VEHICLE

TECHNICAL FIELD

The present invention relates to an automatic transmission apparatus and an automatic transmission method for a vehicle. Particularly, it relates to an automatic transmission apparatus and an automatic transmission method for a vehicle both for power-assisting a shift lever.

BACKGROUND ART

Japanese Patent Application Laid-open publication No. 2003-301942 discloses an automatic transmission apparatus for a vehicle. With the disclosed transmission apparatus, a driver needs less force than otherwise for operating the shift lever thanks to a motor driven in response to the value detected by a torque sensor provided to the shift lever.

This type of automatic transmission apparatus for a vehicle begins the power assist control on the shift lever when the detected value of the torque sensor exceeds a certain threshold value. On the other hand, the automatic transmission apparatus stops the power assist control when the detected value of the torque sensor is equal to, or less than, the threshold value, or when the shift lever moves to a certain predetermined shift position. The detected value of the torque sensor becomes zero, which is below the above-mentioned threshold value, when the driver's hand is released from the shift lever. As a result, the automatic transmission apparatus stops the power assist control.

In this type of automatic transmission apparatus for a vehicle, the torque sensor detects the load on the shift lever at the side of the motor. In addition, a position gate is provided to restrict the movement of the shift lever. A press on the operation button on the shift lever releases the restriction by the position gate, and allows the driver to operate the shift lever.

DISCLOSURE OF INVENTION

In this type of automatic transmission apparatus, a torque sensor detects an operation of the shift lever which is not accompanied by a press on the operation button, and then the motor is driven according to the detected value of the torque sensor. Just after the motor is driven, the position gate restricts the movement of the shift lever. The inertia of the transmission mechanism and the delayed motor drive cause a twist in the torque sensor in a reverse direction. A reversal which occurs in the detected value from a positive value to a negative value, or vice versa, causes a power assist in the direction contradicting the driver's operation.

Shifting from P (Parking) range is restricted in both directions. An operation of the shift lever positioned in P range without a press on the operation button cause the shift lever to vibrate between position gates. Shifting from N (Neutral) range, or from D (Drive) range, is restricted in one of the two directions. An operation of the shift lever positioned in either N range or D range without a press on the operation button causes a power assist to be carried out on the shift lever to a direction from N range to R (Reverse) range. This movement of the shift lever faces a restriction by the position gate, and a reverse power assist is carried out on the shift lever, that is, the shift lever is driven from N range to D range.

The present invention has been made in view of these points, and is aimed at providing an automatic transmission apparatus for a vehicle and a method of automatic transmission for a vehicle which are free from the problem of vibrating shift lever, and in which no reverse power assist takes place.

According to a first aspect of the present invention, an automatic transmission apparatus for a vehicle has a shift lever, a position gate, an operation force detector, and a controller. The shift lever is provided to be capable of being operated to move to a plurality of positions. The operator operates the shift lever, and moves it to each of the positions in order to switch ranges of the automatic transmission. The position gate restricts the position of the shift lever. In addition, when an operation button provided on the shift lever is pressed, the position gate releases the restriction, and thus the shift lever is made capable of changing positions. The operation force detector detects the operation force on the shift lever. The controller, according to the detected value of the operation force detector, determines whether a power-assist control is to be carried out. In a case where a power-assist control is actually carried out, the controller drives a motor to provide a power assist to help the operation of the shift lever. The controller limits the driving force of the motor, and thus prevents a reversal of power-assist direction. The reversal is brought about by a reversal of the detected value, from a negative value to a positive one, or vice versa, of the operation force detector. The reversal of the detected value occurs in a case where the shift lever is operated without releasing the restriction by the position gate, and the shift lever hits the position gate.

According to a second aspect of the present invention, an automatic transmission method has a first step of switching the ranges of the automatic transmission. The switching is carried out by operating a shift lever provided as being capable of being operated to move to a plurality of positions, and by moving the shift lever to each position. The automatic transmission method has a second step of enabling the shift lever to change positions. When an operation button provided on the shift lever is pressed, a restriction imposed, by a position gate, on the position of the shift lever is released to allow the changing of positions. The automatic transmission method has a third step of detecting the operation force on the shift lever. The automatic transmission method has a fourth step of determining, according to the detected value that is detected in the third step, whether a power-assist control is to be carried out. Additionally, in a case where a power-assist is actually carried out, a motor is driven to provide a power assist to help the operation of the shift lever. In the fourth step, a reversal of power-assist direction is prevented from taking place by limiting the driving force of the motor. The reversal is brought about by a reversal of the detected value, from a negative value to a positive one, or vice versa, detected in the third step. The reversal of the detected value occurs in a case where the shift lever is operated without releasing the restriction by the position gate, and where the shift lever hits the position gate.

BEST MODE FOR CARRYING OUT THE INVENTION

Hereinbelow, an automatic transmission apparatus and an automatic transmission method for a vehicle according to the best mode for carrying out the present invention will be explained by referring to the accompanying drawings.

First Embodiment

Figure 1:
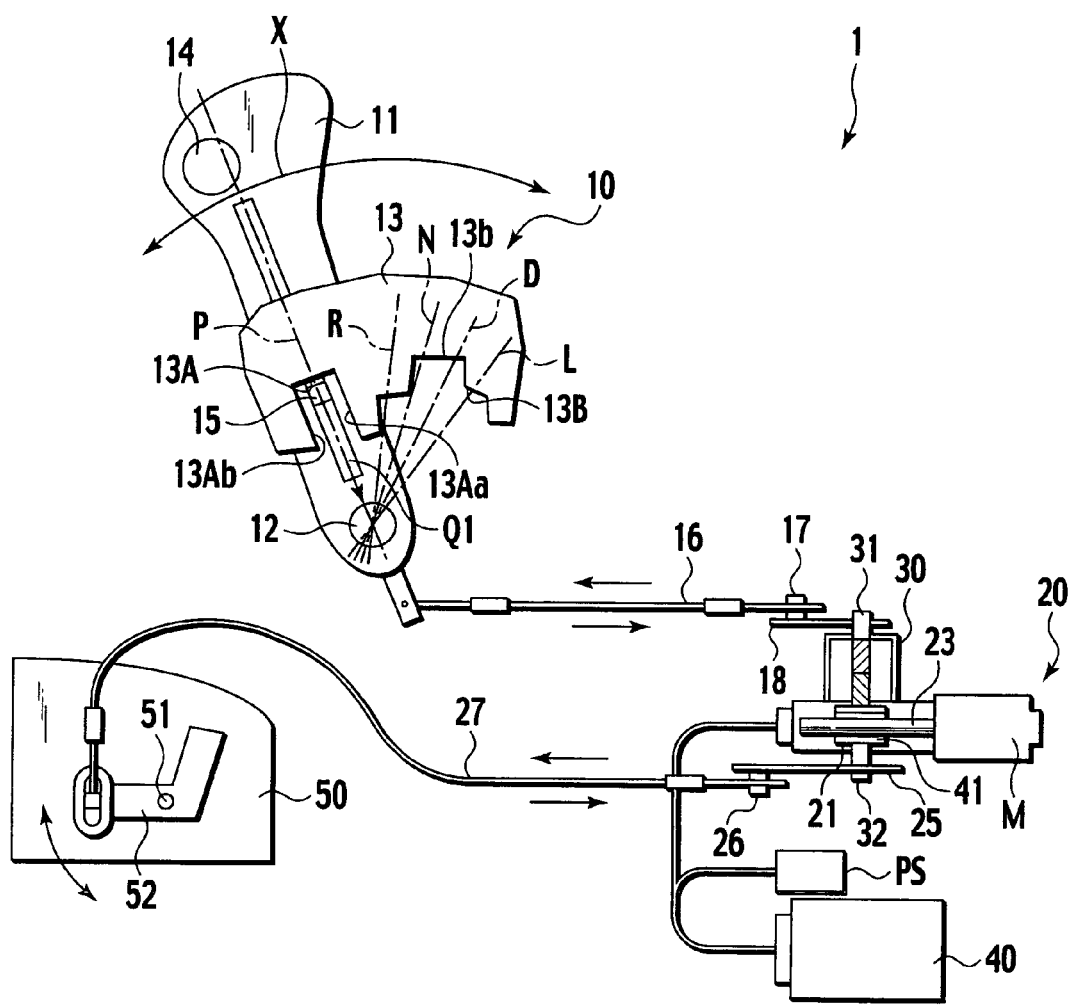
FIG. 1 is a schematic configuration view of an automatic transmission apparatus for a vehicle according to a first embodiment of the present invention.

FIG. 1 shows a schematic configuration of an automatic transmission apparatus 1 for a vehicle according to a first embodiment of the present invention. The automatic transmission apparatus 1 for a vehicle has a select unit 10, an actuator unit 20, a torque sensor 30, a potentiometer 41, a control unit 40 and an automatic transmission 50.

The select unit 10 has a shift lever 11. The actuator unit 20 provides a power assist to the shift lever 11. The torque sensor 30 detects an operation force on the shift lever 11. The potentiometer 41 detects a shift position (position) of the shift lever 11. The control unit 40 controls a motor M of the actuator unit 20 according to the detection signal of the torque sensor 30 and to the position of the shift lever 11 detected by the potentiometer 41. The automatic transmission 50 switches ranges (gear ratios and the like) by operation of the shift lever 11.

The select unit 10 has a shift lever 11, a position gate 13, an operation button 14 and a gate pin 15. The shift lever 11 is provided as being capable of turning back and forth (in directions of arrow X in FIG. 1) on the fulcrum shaft 12. The position gate 13 restricts the shift position of the shift lever 11. The operation button 14 and the gate pin 15 are provided on the shift lever 11.

Five shift positions P, R, N, D and L (Low) are set up in the position gate 13. Recessed portions 13A, 13B and 13b are formed in the position gate 13 so that the recessed portions can correspond to each of the positions P, R, N, D and L. The recessed portion 13b is formed in the recessed portion 13B.

The gate pin 15 slots into the recessed portion 13A when the shift lever 11 is in the position P, and restricts the movement of the shift lever 11 to the other positions R, N, D and L. A press on the operation button 14 moves the gate pin 15 in a direction of arrow Q1, and thus the gate pin 15 leaves the recessed portion 13A. This allows the shift lever 11 to turn and move to the other positions R, N, D and L.

When the shift lever 11 is in any other positions, which is R, N, D or L, walls forming the recessed portions 13B and 13b restrict the gate pin 15. A press on the operation button 14 moves the gate pin 15 downward, releases the restriction, and thus allows the shift lever 11 to turn and move to a different position.

Figure 2:
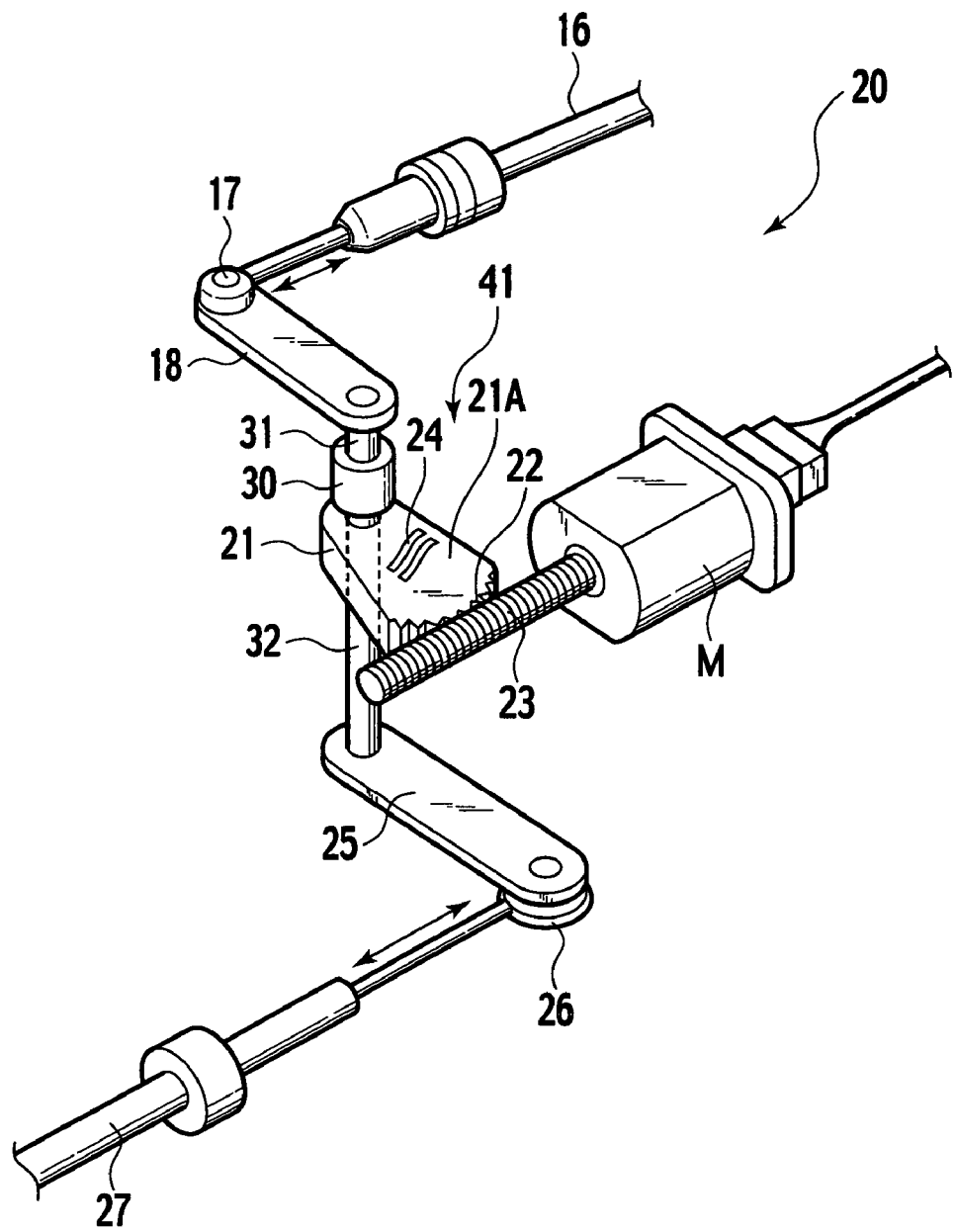
FIG. 2 is a perspective view of an actuator unit of the automatic transmission apparatus of the FIG. 1.

FIG. 2 shows the actuator unit 20 of the automatic transmission apparatus 1 of FIG. 1. An end of a push-pull type control cable 16 is attached to the bottom of the shift lever 11 shown in FIG. 1. As is shown in FIG. 2, the other end of this control cable 16 is connected to an end of an input lever 18 with an input lever joint 17. The other end of the input lever 18 is fixed to a pivot shaft 31 of the torque sensor 30.

A turning operation of the shift lever 11 moves the control cable 16 in the right or left direction (in the same directions as the control cable 16 extends). The input lever 18 turns around the axis of the pivot shaft 31 of the torque sensor 30 along with this pivot shaft 31. As a result, a torque which reflects how much the input lever 18 turns is applied to the torque sensor 30.

The actuator unit 20 has a sectorial worm gear member 21, a worm 23 and the motor M. The base portion of the sectorial gear member 21, that is the portion near the center of the sector, is fixed to the other pivot shaft (the pivot shaft opposite to the input lever 18 with the torque sensor 30 situated in between) 32 of the torque sensor 30. The arc of the sector of the gear member 21 is geared to form a gear 22. The worm 23 meshes with the gear 22. The motor M causes the worm 23 to rotate on this pivot shaft 32. The worm 23 is connected directly to a drive shaft (not illustrated) of the motor M. A rotation of the worm 23 driven by the motor M turns the gear member 21 along with the turn of the pivot shaft 32, about the axis of the pivot shaft 32 at the other side of the torque sensor 30.

A contact 24 is provided on an upper face 21A of the gear member 21 (the face on which the torque sensor 30 of the gear member 21 is provided). The contact 24 turns along with the gear member 21, and comes into electrical contact with a carbon resistance printed on an unillustrated substrate. This contact allows a current to flow between the contact 24 and the carbon resistance. The change of the current intensity reflects the turning angle of the gear member 21, that is, the turning angle (shift position) of the shift lever 11.

The contact 24 and the carbon resistance printed on the substrate form the potentiometer 41. The potentiometer 41 detects, as needed basis, a stroke angle (turning angle) of the shift lever 11, or the shift position thereof, taking the angle formed by the shift lever 11 in the position P as a reference position.

When the pivot shafts 31 and 32 of the torque sensor 30 turn in the same direction, the torque on the torque sensor 30 decreases. In contrast, when the pivot shafts 31 and 32 turn in the opposite directions to each other, the torque increases. The torque sensor 30 detects a load torque using the magnitude of distortion (twist) which takes place between pivot shafts 31 and 32.

An end of an output lever 25 is fixed to the bottom (to the side of the pivot shaft 32 opposite to the side at which the torque sensor 30 is provided) of the pivot shaft 32 of the torque sensor 30. The output lever 25 turns about the axis of the pivot shaft 32 along with the pivot shaft 32. The other end of the output lever 25 is connected to an end of a push-pull type control cable 27 via an output lever joint 26.

A turn of the output lever 25 about the pivot shaft 32 moves the control cable 27 in the right or left direction (in the same directions as the control cable 27 extends) as an arrow (in FIG. 2) indicates.

The automatic transmission 50 has a rotating shaft 51 and a control arm 52, which is fixed to the rotating shaft 51. The control arm 52 turns about the axis of the rotating shaft 51 along with the rotating shaft 51, in response to the right or left movement of the control cable 27.

The operation force on the shift lever 11 turns the pivot shaft 31 of the torque sensor 30 while the driving force of the motor M turns the pivot shaft 32 of the torque sensor 30. The resultant force of the above operation force and the above driving force is transmitted to the control arm 52.

Figure 3:
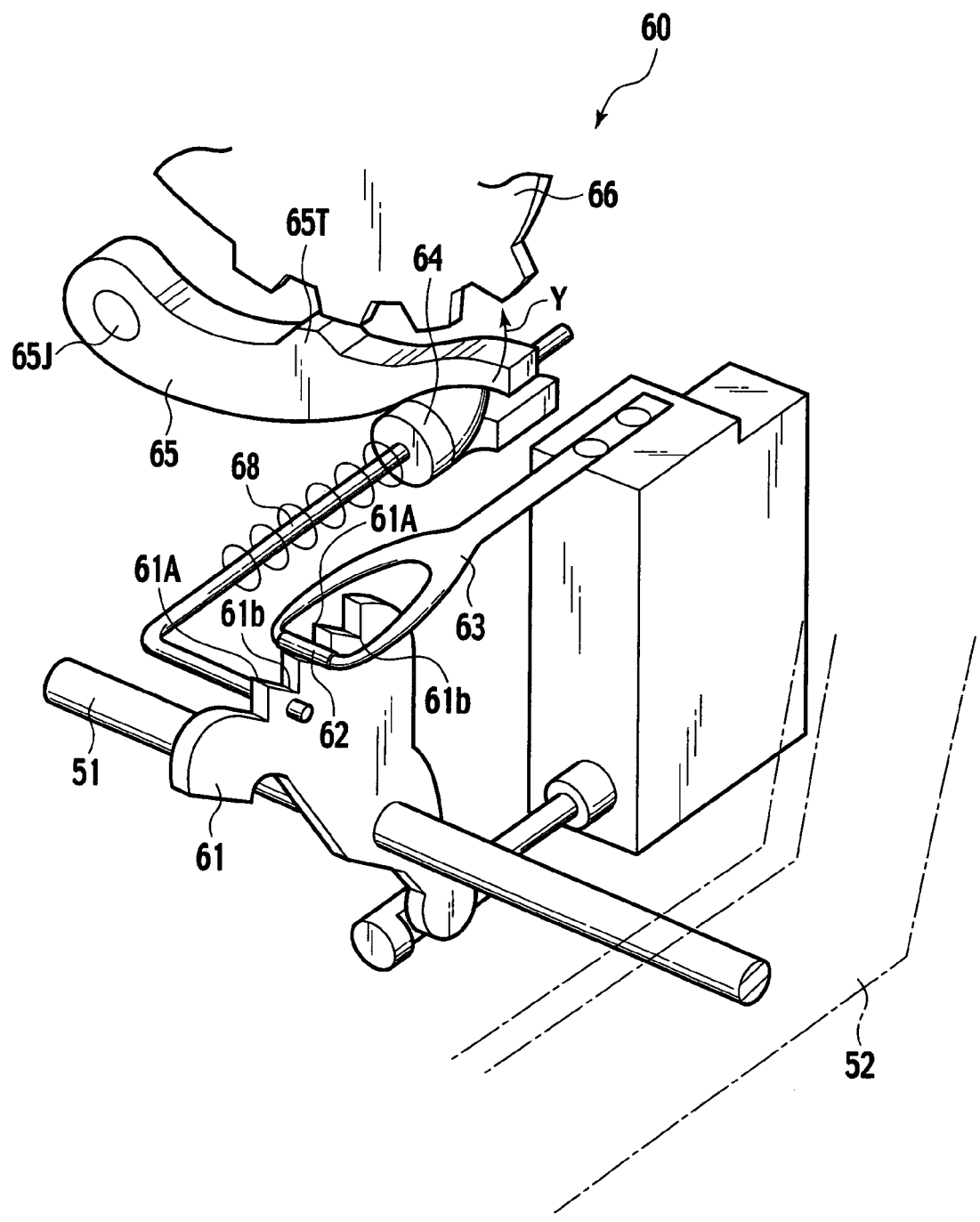
FIG. 3 is a perspective view of a range-shift mechanism of the automatic transmission apparatus of the FIG. 1.

FIG. 3 shows a range switch mechanism 60 of the automatic transmission apparatus 1 of FIG. 1. The range switch mechanism 60 has a detent plate 61 including a detent portion where five valley portions 61b are formed, and a spring plate 63. The rotating shaft 51 of the automatic transmission 50 pivotably supports the detent plate 61, which extends in a radial direction of the shaft 51. In other words, the detent plate 61 has plate faces perpendicular to the rotating shaft 51. The five valley portions 61b demarcated by cam peaks 61A are formed at edge portions of the respective plate faces of the detent plate 61. The spring plate 63 is made of a cantilevered elastic plate. A detent pin 62, which can engage with any of the valley portions 61b, is held at a tip of a two-forked portion of the spring plate 63. The five valley portions 61b correspond respectively to the five positions (P, R, N, D and L) of the position gate 13. The detent pin 62 engages with any one of the valley portions 61b by the spring force of the spring plate 63, which biases the detent pin 62 towards the detent plate 61, and thereby preventing an unpredictable shift of the shift lever 11 due to, for example, the vibration of the vehicle.

The operation force on the shift lever 11 turns the rotating shaft 51. The detent plate 61 moves relatively to the detent pin 62 in response to the turn of the rotating shaft 51. The detent pin 62 rides over the cam peak 61A against the spring force of the spring plate 63, and then moves to and engages with the adjacent valley portion 61b corresponding to the next position. When the detent pin 62 rides over the cam peaks 61A, the spring force of the spring plate 63 biases the detent pin 62 to keep the detent pin 62 in a state of being engaged. This biasing spring force is a main load on the shift lever 11 when the shift lever 11 is operated.

A turn of the detent plate 61 switches ranges of the automatic transmission 50 from one to another.

The rear end of an L-shaped arm 68 is connected to the detent plate 61. The L-shaped arm 68 turns on the rear end. A parking pole 64 is provided to the front end of the arm 68.

When the shift lever 11 moves to the position P, the parking pole 64 turns a cam plate 65 counterclockwise (in a direction Y in FIG. 3) on the axis of a pivot shaft 65J. The counterclockwise turn of the cam plate 65 causes a protrusion 65T to engage with a parking gear 66. By use of the engagement of the protrusion 65T, the parking pole 64 blocks a rotation of the parking gear 66, and locks an unillustrated driving wheel. In addition, when the vehicle is parked on a sloped road (with the shift lever 11 in the position P), a load of the vehicle weight reflecting the slope angle acts in a direction holding the parking pole 64 tightly. Thus, the driving wheel is locked.

Figure 4:
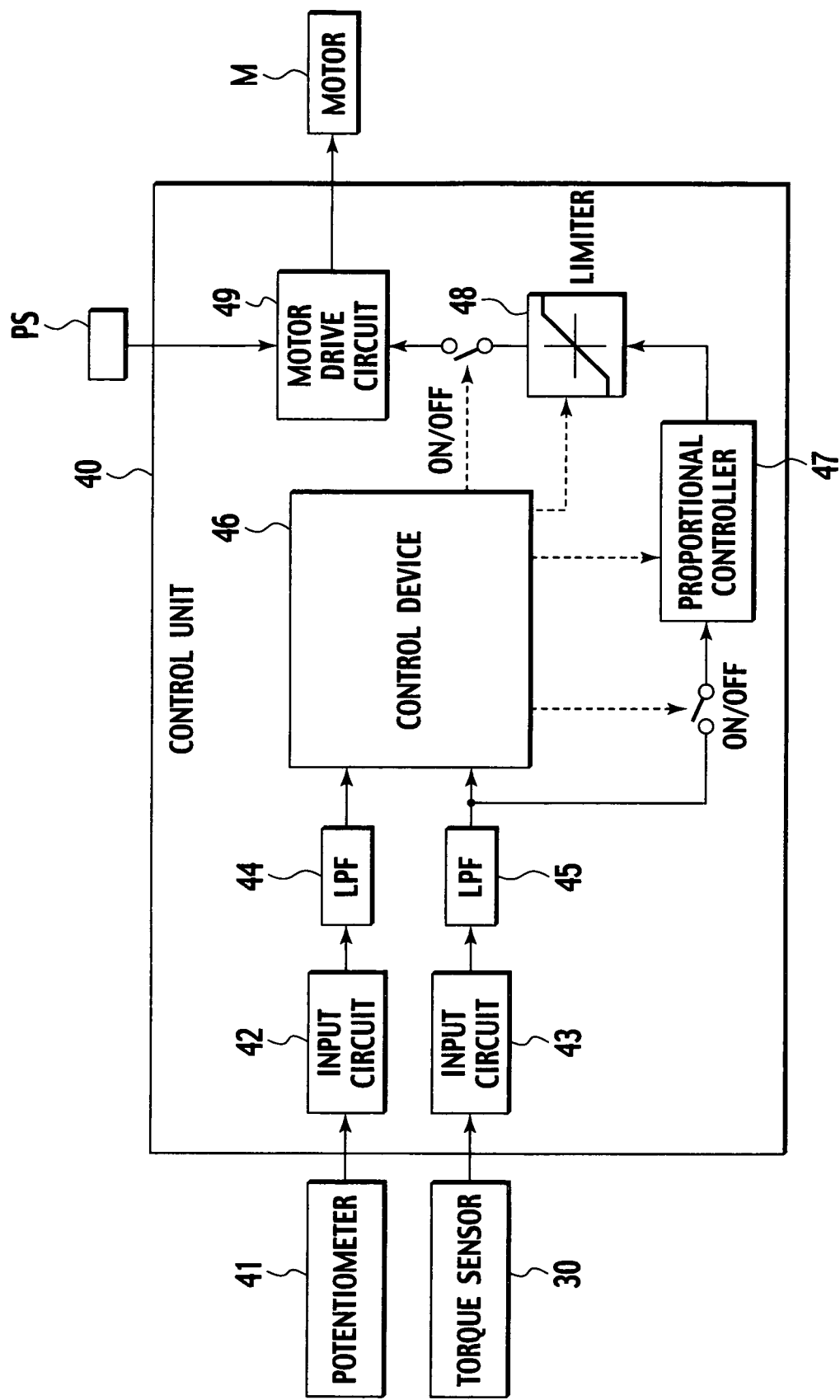
FIG. 4 is a block diagram of a control unit of the automatic transmission apparatus of FIG. 1.

FIG. 4 is a block diagram showing the control unit 40. The control unit 40 has input circuits 42 and 43, lowpass filters 44 and 45, a control device 46, a proportional controller 47, a limiter 48 and a motor drive circuit 49. The input circuit 42 inputs a shift-position signal of the shift lever 11 outputted from the potentiometer 41. The input circuit 43 inputs a signal of a detected torque value outputted from the torque sensor 30. The lowpass filters 44 and 45 denoise signals outputted from the input circuits 42 and 43, respectively. The control device 46 obtains the direction in which the shift lever 11 is operated and the shift position thereof according to the shift-position signal from a potentiometer 41 and the signal of the detected torque value from the torque sensor 30. The proportional controller 47 outputs a proportional control signal according to the signal of the detected torque value of torque sensor 30. The limiter 48 puts a limit on the minimum output of the motor M. The motor drive circuit 49 is supplied with electric power from a power source PS, and drives the motor M.

The control device 46 is configured as a microcomputer which includes a CPU (Central Processing Unit), and controls the proportional controller 47 and the limiter 48. The motor drive circuit 49 controls the motor M in a PWM (Pulse Width Modulation) scheme according to the proportional control signal from the proportional controller 47.

Operation

Figure 5:
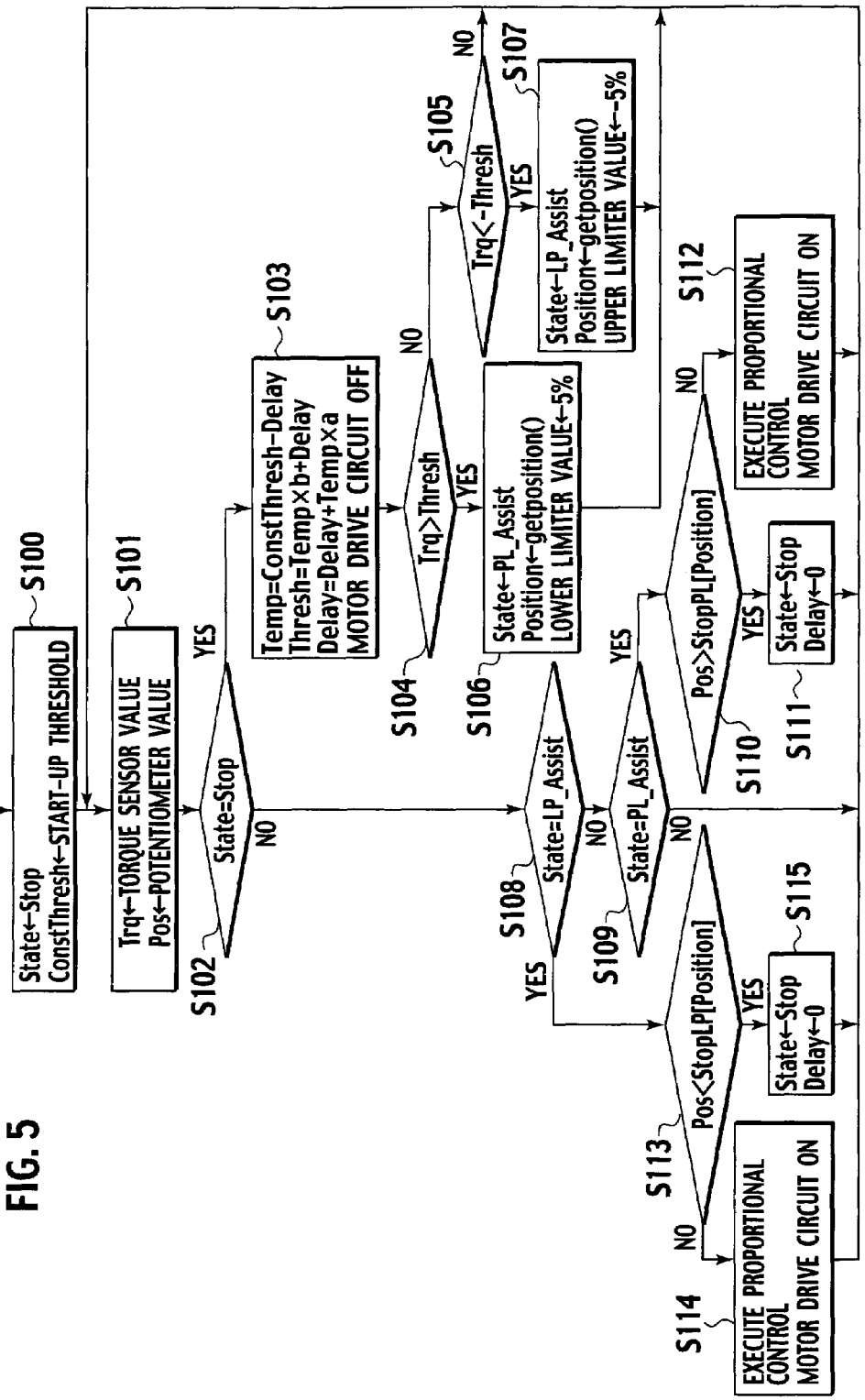
FIG. 5 is a control flow chart of the control unit of FIG. 4.

The operation of the control unit 40 will be explained by referring to a control flow chart of FIG. 5.

The explanation with this control flow will be based, as an example, on a case in which the shift position of the shift lever 11 is position P. The explanation is applicable to another case in which the shift lever 11 is in a position other than the position P. The control flow of FIG. 5 starts when an unillustrated ignition switch is turned on.

In step S100, a value Stop representing a stop, is assigned to a variable State representing a state. A startup threshold value equivalent to 0.3 N·m is assigned, as a specified value, to a variable ConstThresh representing an initial setting value.

In step S101, a detected value of the torque sensor 30 is assigned to a variable Trq representing a torque value. A value representing a shift-position signal of the potentiometer 41 is assigned to a variable Pos representing a turning amount of the shift lever 11.

In step S102, a determination is carried out as to whether the variable State is Stop. When the variable State is Stop, that is, in a case of Y (yes), the flow proceeds to step S103.

In step S103, a threshold value (Thresh) corresponding to the specified value (ConstThresh) is obtained by the following Equations (1) to (3).

$$\text{Temp} = \text{ConstThresh} - \text{Delay} \qquad \text{Equation 1}$$

$$\text{Thresh} = \text{Temp} \times b - \text{Delay} \qquad \text{Equation 2}$$

$$\text{Delay} = \text{Delay} + \text{Temp} \times a \qquad \text{Equation 3}$$

Here, Delay is a variable representing a delay, and Temp is a variable representing a current state, while a and b are respectively constants.

Figure 6:
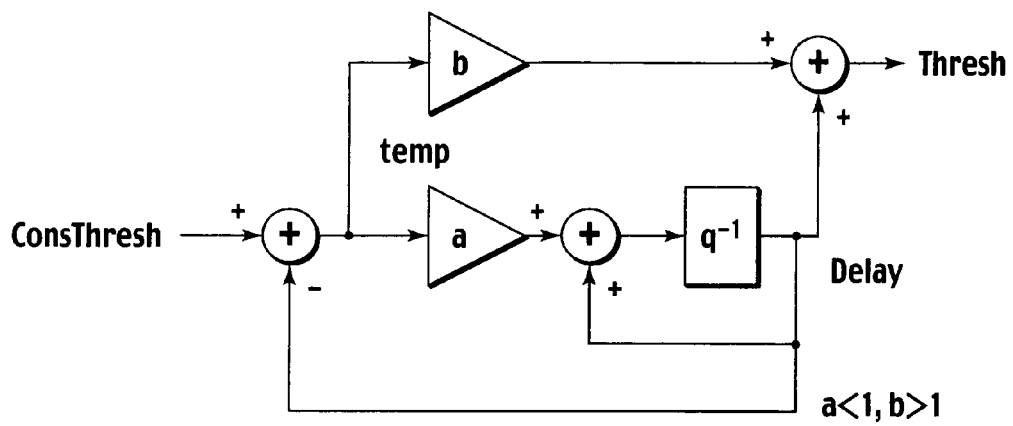
FIG. 6 is a block diagram for expressing arithmetic operations of threshold value for power-assist control of the control unit of FIG. 4.

The value of Delay is zero in the first cycle. The specific value (ConstThresh) is set in advance. A block diagram of FIG. 6 shows the arithmetic operations expressed by Equations 1 to 3. A delay in one sample time is denoted by $q^{-1}$. Incidentally, in step S103, in a case where the motor drive circuit is OFF with the motor M being ON, the driving of the motor M stops.

In step S104, a determination is carried out as to whether the variable Trq is larger than a certain threshold value (Thresh) When Trq>Thresh (i.e., Y), then the flow proceeds to step S106. When it is not the case (i.e., N), the flow proceeds to step S105.

In step S105, a determination is carried out as to whether the variable Trq is smaller than a certain threshold value (−Thresh). When Trq<−Thresh (i.e., Y), then the flow proceeds to step S107. When it is not the case (i.e., N), the flow proceeds back to step S101, again.

The procedure from step S101 to step S105 is repeatedly carried out until the shift lever 11 moves successfully.

Figure 7:
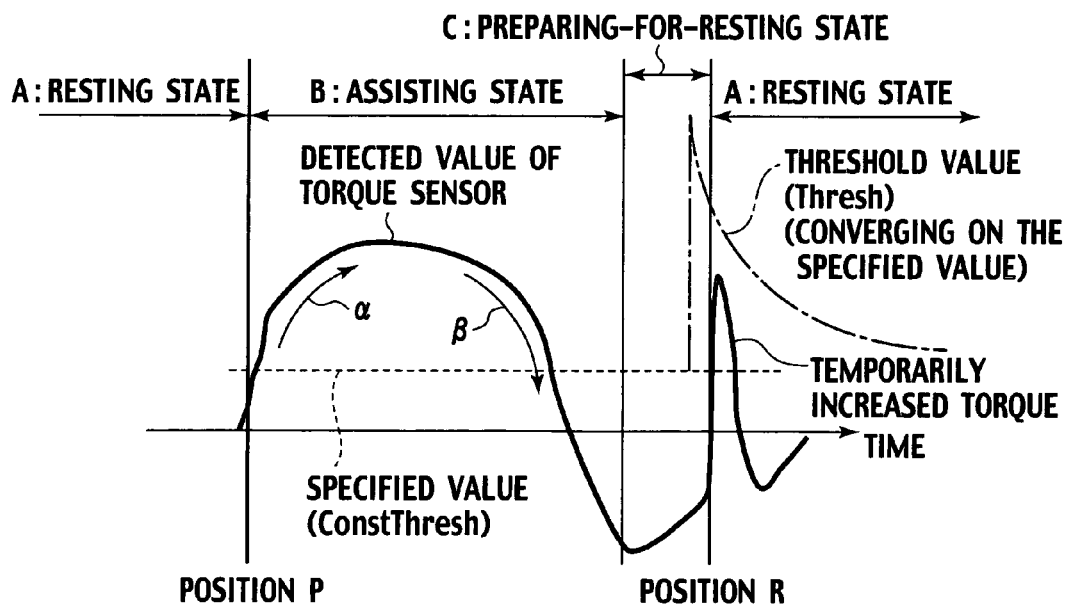
FIG. 7 is a time chart showing a relationship between the detected value of the torque sensor and the threshold value for a power-assist control of the automatic transmission apparatus of FIG. 1.

By repeating the procedure from step S101 to step S105, the threshold value (Thresh) takes a larger value at first, and then converges on the specified value (ConstThresh) over time, as is shown in FIG. 7.

In an early stage just after the shift lever 11 begins to turn, the detected value of the torque sensor 30 does not rise drastically, but increments as the shift lever 11 turns. Meanwhile, the threshold value (Thresh) decreases (converges on the specified value) over time. In due course of time (several tens of milliseconds later), the variable Trq exceeds the threshold value (Thresh), and then the determination in step S104 becomes Y. This determination as Y in step S104 causes the power-assist control to be executed.

As is shown in FIG. 7, in a case where the shift lever 11 in a resting state (A: a resting state) is made to change its shift positions moving from the position P to the position R, the detected value of the torque sensor 30 increments (as is shown by arrow α) as the shift lever 11 turns. When the variable Trq exceeds the threshold value (Thresh), the power assist is carried out (B: an assisting state). Then, even when the detected value of the torque sensor 30 decreases (as is shown by arrow β), the power assist continues. It continues until the shift lever 11 comes sufficiently close to the position R. After that, the shift lever 11 is made in a state of preparing for a transition to the resting state A (C: a preparing-for-resting state).

When the shift lever 11 moves (turns), the detent pin 62 rides over one of the cam peaks 61A located between positions P and R. The detent pin 62 eventually engages with the valley portion 61b of the position R which is next to the overridden cam peak 61A. At this moment, the detent pin 62 thrusts against the end face of the next one of the cam peaks 61A. This causes a temporary increase in the detected value of the torque sensor 30 (see FIG. 7). A detection value of the torque sensor 30 over the specified value (ConstThresh) caused in a way described above needs to be prevented from causing another power assist to be executed. For this purpose, the threshold value is set higher in the preparing-for-resting state C (see FIG. 7).

When the shift lever 11 turns, and when the determination in step S104 or that in step S105 becomes Y, the flow proceeds to step S106 or step S107, respectively.

In step S106, a value PL_Assist is assigned to the variable State. The value PL_Assist represents a power assist to help the movement from the position P to the position L. Meanwhile, the shift position (i.e., the position P, R, N, D or L) of the shift lever 11 is obtained according to the shift position signal of the potentiometer 41. A value getposition( ) corresponding to this shift position is assigned to a variable Position, and the lower limit value of the duty ratio of the motor drive circuit 49 is set at 5%. After that, the flow proceeds to step S101.

In step S107, a value LP_Assist is assigned to the variable State. The value LP_Assist represents a power assist to help the movement from position L to position P. Meanwhile, the shift position (i.e., position P, R, N, D or L) of the shift lever 11 is obtained according to the shift-position signal of the potentiometer 41. A value getposition( ) corresponding to this shift position is assigned to a variable Position, and the upper limit value of the duty ratio of the motor drive circuit 49 is set at −5%. After that, the flow proceeds to step S101.

In step S101, the latest detected value of torque sensor 30 and the latest shift-position signal of the potentiometer are acquired.

When the variable State is set to be PL_Assist, and when the determination in step S102 is N, the flow proceeds to step S108.

In step S108, whether the variable State is LP_Assist is determined. In a case where the variable State is set to be PL_Assist in step S106, it is determined as N in step S108, and the flow proceeds to step S109.

In step S109, whether the variable State is PL_Assist is determined. In a case where the variable State is set to be PL_Assist in step S106, It is determined as Y in step S109, and the flow proceeds to step S110. In a case where the variable State is not set to be PL_Assist, It is determined as N, and the flow proceeds back to step S101.

As is shown in FIG. 7, the shift lever 11 is made in the resting state A before the shift lever 11 is actually stopped at each one of the positions. In step S110, whether the shift lever 11 is in the resting state A is determined on the basis of the value StopPL[Position] representing the stop position of the power assist to help the movement from the position P to the position L. When the variable Pos exceeds the value StopPL[Position], it is determined that the shift lever 11 is in the resting state A (Y). Then, the flow proceeds to step S111. When it is not the case (N), the flow proceeds to step S112. In an early stage just after the shift lever 11 begins to turn, it is determined as N, and the flow proceeds to step S112.

In step S112, the motor drive circuit 49 is turned on, and a proportional control of power assist based on the detected value of the torque sensor 30 is executed. The flow of steps S101, S102, S108, S109, S110 and S112 is repeated until the shift lever 11 is made in the resting state A.

Instep S111, a value Stop is assigned to the variable State, and the motor drive circuit 49 is stopped. A value zero is assigned to the variable Delay. Then, the flow proceeds to step S101.

In a case where the shift lever 11 turns in a direction opposite to the direction of the case described above, it is determined as N in step S104, and is determined as Y in step S105. Then, the flow in step S107 is executed. Accordingly, it is determined to be Y in step S108. In step S113, whether the shift lever 11 is in the resting state A is determined on the basis of the value StopLP[Position] representing the position to stop the power assist to help the movement from the position L to the position P. When the variable Pos is below the value StopLP[Position], it is determined that the shift lever 11 is in resting state A (Y). Then, the flow proceeds to step S115. When it is not the case (N), the flow proceeds to step S114. In an early stage just after the shift lever 11 begins to turn, it is determined as N, and the flow proceeds to step S114.

In step S114, the motor drive circuit 49 is turned on, and a proportional control of power assist based on the detected value of the torque sensor 30 is executed. The flow of steps S101, S102, S108, S113, and S114 is repeated until the shift lever 11 is made in the resting state A.

In step S115, a value Stop is assigned to the variable State, and the motor drive circuit 49 is stopped. A value zero is assigned to the variable Delay, and the flow then proceeds to step S101.

Figure 8:
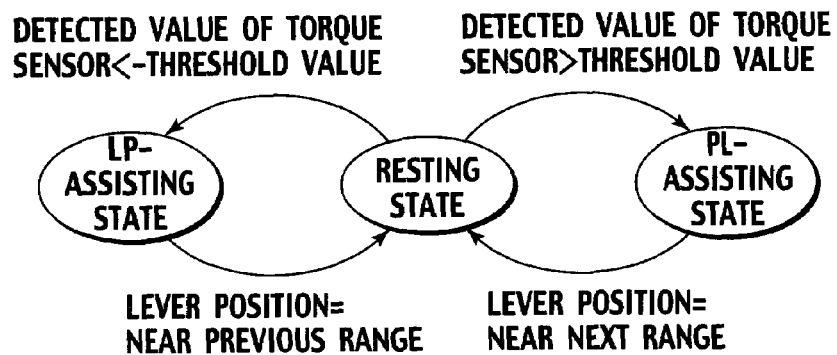
FIG. 8 is a state-transition diagram of the power-assist control of the automatic transmission apparatus of FIG. 1.

FIG. 8 shows a state-transition diagram of the automatic transmission apparatus 1. When the detected value of the torque sensor 30 exceeds the threshold value with the shift lever 11 being in a resting state, the control is made in a PL-assist state, and the power assist is carried out in a direction from a P range to an L range. When the detected value of the torque sensor 30 falls below the threshold value, the control is set in a LP-assist state, and the power assist is carried out in a direction from the L range to the P range. In this LP-assist state, when the shift lever 11 moves to a position near the subsequent range (the next position), the control is set in a resting state. In PL-assist state, when the shift lever 11 moves to a position near the range where the shift lever has been previously (the previous position), the control is set in a resting state.

In step S111, when the shift lever 11 is stopped, the detent pin 62 thrusts against the end face of the next one of the cam peaks 61A. This causes a temporary increase in the detected value of the torque sensor 30 (see FIG. 7). However, by repeating the processes of steps S101 to S105, the threshold value (Thresh) is first elevated to a large value, and converges on the specified value (ConstThresh) over time (see FIG. 7). This prevents the detected value of the torque sensor 30 from exceeding the specified value (ConstThresh), and prevents the control from being in an assisting state again (see FIG. 7). Process of step S115 has the same effects as that of step S111.

Explanations will be given now as to a case where the shift lever 11 turns to the right from the position P shown in FIG. 1 without pressing the operation button 14.

The turn of the shift lever 11 causes the flow of step S100 to S105 to be executed, and causes the threshold value (Thresh) to be set.

As the shift lever 11 turns further, the detected value of the torque sensor 30 becomes larger, and the threshold value (Thresh) is lowered over time. Once the detected value of the torque sensor 30 exceeds the threshold value (Thresh), it is determined as Trq>Thresh (Y) in step S104, and the flow proceeds to step S106. In step S106, the value PL_Assist is assigned to the variable State, the value getposition( ) of the position P, R, N, D or L is assigned to the variable Position, and the lower limit value of the duty ratio of the motor drive circuit 49 is set to be 5%.

Figure 9:
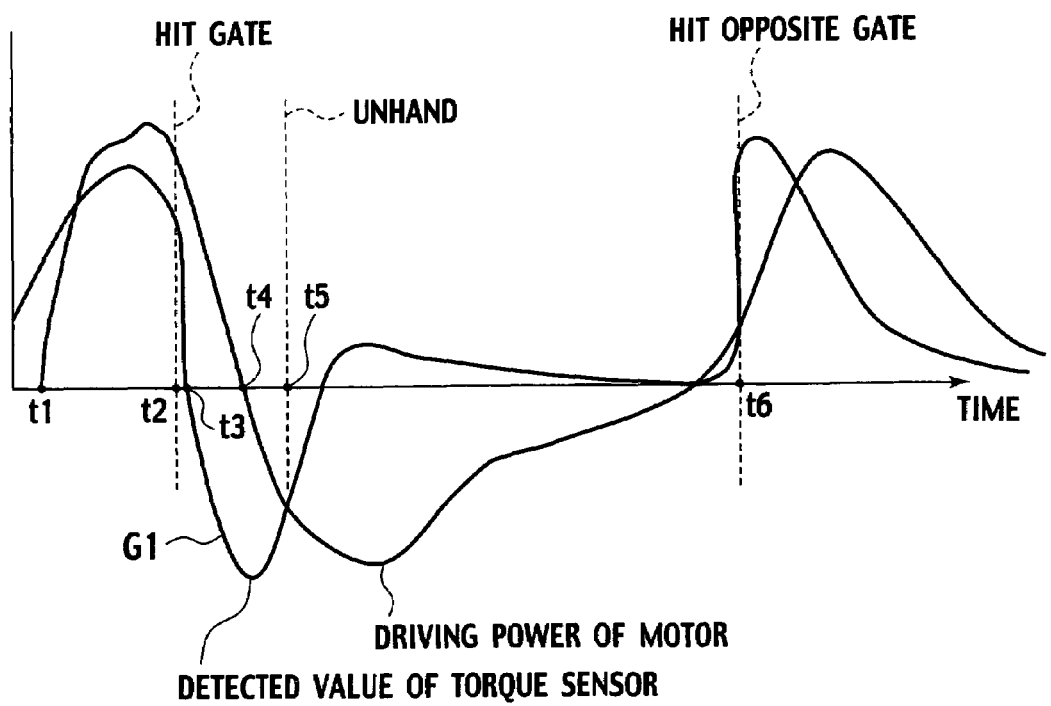
FIG. 9 is a time chart showing a relationship between the detected value of a torque sensor of the automatic transmission apparatus of FIG. 1 and the driving force of the motor.

The flow of steps S101, S102, S108, S109 and S110 is executed in a similar way to that described above. In step S112, the motor M is driven and power-assist is carried out on the shift lever 11. FIG. 9 shows a time chart illustrating a relationship between the detected value of the torque sensor 30 and the driving force of the motor M. The motor M rotates in a regular direction (a direction in which a power-assist to the right is performed on the shift lever 11 in FIG. 1) to carry out a power assist on the shift lever 11 at a time t1. Then, the gate pin 15 hit a wall (gate) 13Aa of the recessed portion 13A of the position gate 13 (at a time t2), and the detected value of the torque sensor 30 falls rapidly. The inertia of the automatic transmission 50 or the delayed drive of the motor M causes the detected value of the torque sensor 30 to be negative (corresponding to a curve G1). As a result, the motor M rotates in a reverse direction (at a time t4).

When the operator unhands the shift lever 11 (at a time t5), the release causes the load on the shift lever 11 to be small, and the detected value of the torque sensor 30 comes near zero. As a result, the shift lever 11 moves in the opposite direction.

Once the gate pin 15 hits a wall (gate) 13Ab of the recessed portion 13A of the position gate 13 (at a time t6), the detected value of the torque sensor 30 becomes larger, and exceeds the threshold value. As a result, the motor M rotates in a regular direction, and carries out a power assist on the shift lever 11 to the right. The repeating of these causes the shift lever 11 to vibrate within the recessed portion 13A of the position gate 13.

Nevertheless, the lower limit value of the duty ratio of the motor drive circuit 49 is set at 5% in step S106. Thus, the driving force of the motor M may come near zero, but does not drop to a negative value. The change in the detected value of the torque sensor 30 from positive to negative does not cause the shift lever 11 to move to an opposite direction, and the shift lever 11 is set in a substantially resting state.

In this way, the shift lever 11 is prevented from vibrating within a recessed portion 13A of the position gate 13. Similarly, even when the gate pin 15 hits the walls 13Aa and 13Ab of the position gate 13 to cause the operator's hand to be released from the shift lever 11, the shift lever 11 does not vibrate. This is because the limitation by 5% (limitation on the minimum driving force) on the duty ratio of the motor drive circuit 49 allows only 5% of the driving force (a driving force near zero) to be generated while the operator's hand is released from the shift lever 11, and thus the detected value of the torque sensor becomes 30 a value near zero.

The shift lever 11 is prevented from vibrating even in a case where the operator's hand is released from the shift lever 11 when the gate pin 15 hits walls of the other recessed portions 13B and 13b of the position gate 13.

Second Embodiment

Figure 10:
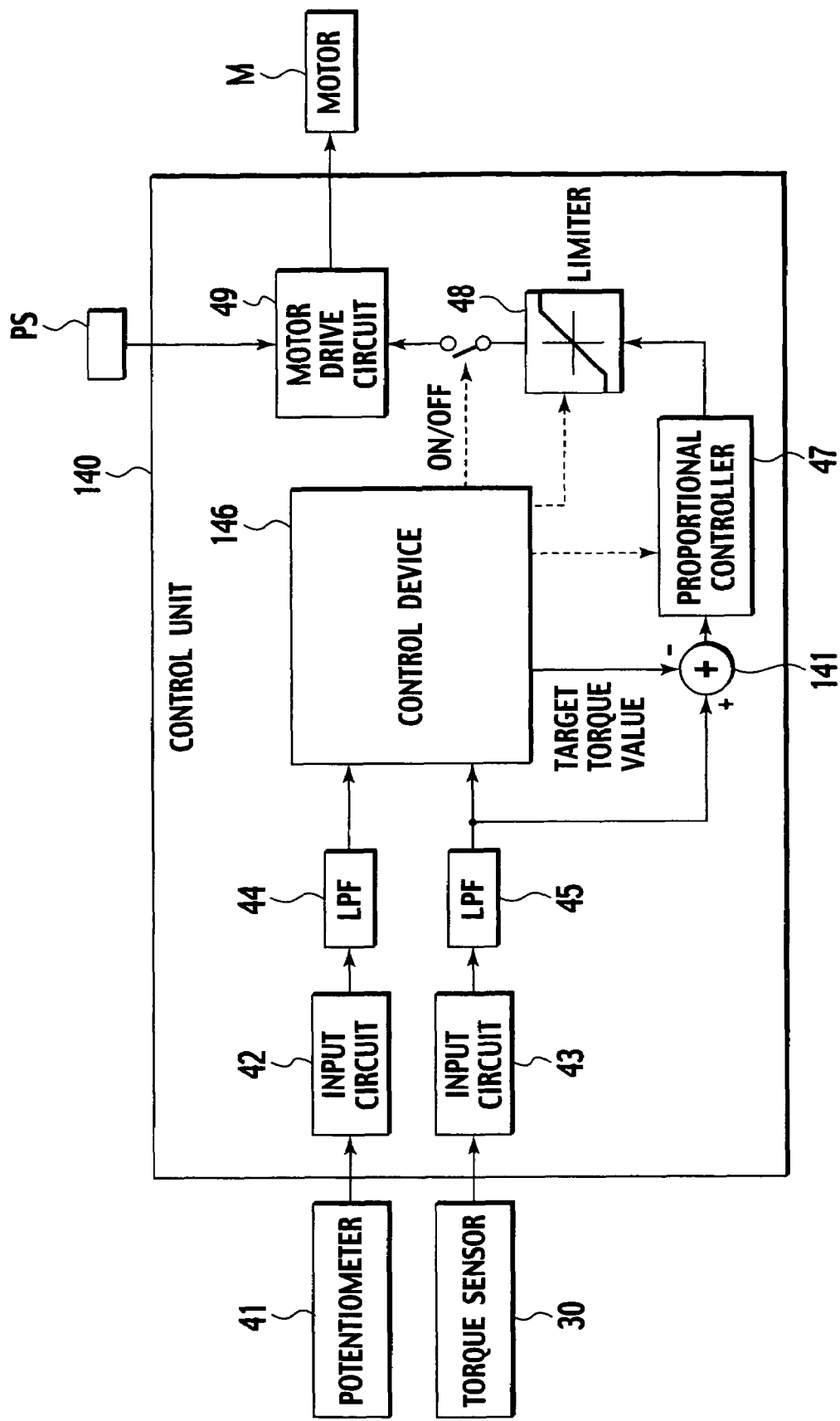
FIG. 10 is a block diagram of a control unit of an automatic transmission apparatus for a vehicle of a second embodiment of the present invention.

FIG. 10 shows a block diagram of a control unit 140 of an automatic transmission apparatus for a vehicle of a second embodiment of the present invention. Note that constituents which are common to FIG. 10 and FIG. 4 are respectively given common reference numerals, and explanations thereof are omitted.

The control unit 140 has a control device 146, an adder 141 and a proportional controller 47. The control device 146 obtains a direction in which a shift lever 11 is operated, and the shift position thereof, according to the shift-position signal from a potentiometer 41 and a detected torque value from a torque sensor 30. Thus, the control device 146 obtains a target torque value (target power-assist value). The adder 141 obtains the difference between the detected value of the torque sensor 30 and the target torque value of the control device 146. The proportional controller 47 outputs a proportional control signal based on the value of the difference calculated by the adder 141.

The target torque value is obtained by selecting an optimum value from a plurality of tables stored in advance, according to the position, the turning direction and the turning speed of the shift lever 11.

Operation

The operation of the automatic transmission apparatus of the second embodiment will be explained by referring to control flow charts of FIGS. 11A and 11B. Note that steps S100 to S105, S108 and S109 are common to FIG. 10 and FIG. 5, and that the explanations thereof are omitted.

In step S206, a value PL_Assist is assigned to a variable State. The shift position (i.e., the position P, R, N, D or L) of the shift lever 11 is obtained according to the shift-position signal of the potentiometer 41. A value getposition( ) corresponding to this shift position is assigned to a variable Position, and the lower limit value of the duty ratio of the motor drive circuit 49 is set at 5%. Concurrently, a target torque value (for example, a target power-assist-force value) is set. After that, the flow proceeds to step S101.

In step S207, a value LP_Assist is assigned to the variable State. Meanwhile, the shift position (i.e., the position P, R, N, D or L) of the shift lever 11 is obtained according to the shift-position signal of the potentiometer 41. A value getposition( ) corresponding to this shift position is assigned to a variable Position, and the lower limit value of the duty ratio of the motor drive circuit 49 is set at 5%. Concurrently, a target torque value is set. After that, the flow proceeds to step S101.

Figure 12:
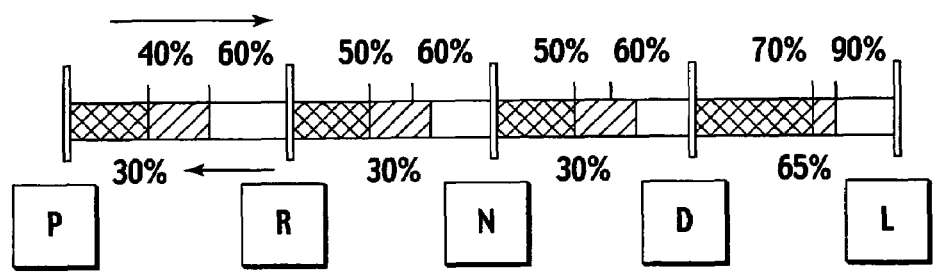
FIG. 12(A) is a diagram showing a relationship between a position of a shift lever 11 moving in a direction from P to L and a position to start braking.
FIG. 12(B) is a diagram showing a relationship between a position of the shift lever 11 moving in a direction from L to P and a position to start braking.
Figure 12:
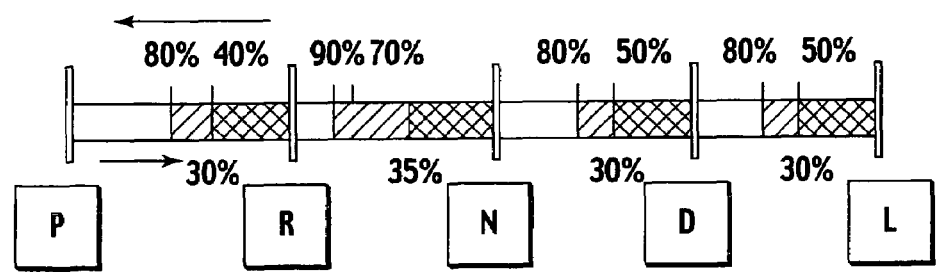

In step S210, a determination is carried out as to whether the shift lever 11 has reached a position where a brake control should be executed. As is shown in FIG. 12, for each of the interstices between the positions of the shift lever 11, there is a position where a brake control starts. The determination, as to whether the shift lever 11 has reached a position where a brake control starts, is carried out by determining whether a variable Pos exceeds a value BrakePL[Position] representing the position where a brake control starts in a direction from P to L.

For example, in a case where the shift lever 11 turns from the position P to the position L (see FIG. 12(A)), the positions where a brake control starts are set at 40%, 50%, 50% and 70% of the distances between positions P and R, R and N, N and D, and D and L, respectively. The reason why the distances respectively between the positions R and N, and the positions N and D are set at 50% is to cause the positions where a brake control starts to correspond to the positions where a detent pin 62 rides over the respective cam peaks 61A of a detent plate 61. The reason why the distance between the positions P and R is set at 40% is to generate a larger braking force. The reason why the distance between the positions N and L is set at 70% is to allow a longer distance of the section where the drive of a motor M is restricted by the lower or the upper limit of the duty ratio.

For example, in a case where the shift lever 11 is in the position P, it is determined that the shift lever 11 has reached the position a brake control starts when the shift lever 11 turns to a direction of the position L, and when it goes past the position equivalent to 40% of the distance between the positions P and R.

The positions where the motor M is stopped are set at 60%, 60%, 60% and 90% of the distances between the positions P and R, R and N, N and D, and D and L, respectively. The reason why the distances between the positions R and N, and between the positions N and D are set at 60% or 90%, respectively, is to cause the positions where the motor M is stopped to correspond to the positions of the respective valley portions 61b of the detent plate 61.

In a case where the shift lever 11 turns from the position L to the position P (see FIG. 12(B)), the positions where a brake control starts are set at 50%, 50%, 70% and 40% of the distances between the positions L and D, D and N, N and R, and R and P, respectively. The above 70% of the distance is set rather long because the movement of the shift lever 11 in a range of the positions N and R is frequently restricted by a position gate 13. The reason why the distance between the positions P and R is set at 40% is to generate a larger braking force. The positions where the motor M is stopped are set at 80%, 80%, 90% and 80% of the distances between the positions L and D, D and N, N and R, and R and P. The 90% of the distance between the positions N and R is set larger than the distances between other pairs of positions.

In a case where a variable Pos>BrakePL[Position] is determined (where it is determined as Y) in step S210, the flow proceeds to step S212. In a case where it is not so determined (where it is determined as N), the flow proceeds to step S211.

In step S212, a value PL_Brake is assigned to a variable State, and the lower limit value of the duty ratio is cancelled. Then, the flow proceeds to step S101. Note that the lower limit value may be replaced with a negative value, instead of being cancelled.

In step S211, a determination is carried out as to whether the detected value of the torque sensor 30 is less than 0.2 N·m, and whether the motor M is driven with a 5% duty ratio. In a case where it is determined that it is not the case (where it is determined as N), the flow proceeds to step S214. In contrast, in a case where it is determined that it is the case (where it is determined as Y), the flow proceeds to step S213.

In step S214, the value of a counter is set at zero. In step S217, the motor drive circuit 49 is turned ON, and a proportional control of the power assist is executed. Then, the flow proceeds to step S101.

In a case where the shift lever 11 turns to the right (in FIG. 1), when the position of the shift lever 11 having turned to move, has not reached the position where a brake control starts, it is determined as N in step S210, and it is determined as N in step S211. Then, the flow in step S214 is executed. In step S217, a power-assist control is executed, and then the flow proceeds to step S101. For example, in a case where the shift lever 11 is being operated to be moved from the position R to the position N, when the shift lever 11 has not gone past the position equivalent to 50% of the distance between the positions R and N, it is determined as N both in step S210 and in step S211.

Accordingly, in a case where the detent pin 62 has not ridden over the cam peak 61A of the detent plate 61, that is, in a case where a larger force is needed for operating the shift lever 11, the processing in each of steps S210, S211, S214 and S217 is executed repeatedly. The processing is repeated until the detent pin 62 rides over the cam peak 61A. In this way, a power assist is carried out appropriately.

Once the detent pin 62 has ridden over the cam peak 61A of the detent plate 61, the detent pin 62 is pulled into the valley portion 61b of the detent plate 61, and thus the shift lever 11 accelerates toward the next position. In order to curb the acceleration of the shift lever 11, the motor M generates a negative driving force, and carries out a brake control.

In a case where the detent pin 62 has ridden over the cam peak 61A of the detent plate 61, a brake control by the motor M is carried out. Specifically, the brake control is carried out in the following way. In step S210, it is determined as Y. In step S212, a value PL_Brake is assigned to a value State, and the lower limit value of the duty ratio of the motor drive circuit 49 is released. This releasing of the lower limit value allows the motor M to generate a negative driving force, so that the brake control is carried out.

Explanations will be given here of a case where the present invention is not employed. Specifically, it is supposed that the shift lever 11 turns to the right from the position P, and that the gate pin 15 is in contact with a wall 13Aa of a recessed portion 13A of the position gate 13. In a state where the gate pin 15 is in contact with the wall 13Aa, the operator holds down the shift lever 11 with his hand.

The motor M is driven by a turn of the shift lever 11. Thus, the shift lever 11 is provided with a power assist. When the gate pin 15 hits the wall 13Aa of the recessed portion 13A of the position gate 13, the turn of the shift lever 11 is restricted. The driving of the motor M lowers the detected value of the torque sensor 30 down to a value near zero, and accordingly it is determined that the operator has unhanded the shift lever 11. As a result, the driving of the motor M is stopped.

As soon as the driving of the motor M is stopped, a torque begins to act on the torque sensor 30. While the motor M is being driven, the motor M counterbalances the torque on the torque sensor 30, and thus the detected value of the torque sensor 30 becomes zero. When the motor M is stopped, the balance is lost, and then the torque sensor 30 twists again. As a result, a positive torque acts on the torque sensor 30.

When the value of the torque on the torque sensor 30 exceeds the threshold value, the motor M is driven, and the detected value of the torque sensor 30 becomes zero again. As a result, the motor M is stopped. After that, a series of these operations is repeated. As has been described thus far, a clockwise turn of the shift lever 11 by the operator in a state where the gate pin 15 is in contact with the position gate 13 causes the motor M to be driven and stopped repeatedly. As a result, a pulsation occurs in the force used for the power assist, and this pulsation makes the driver uncomfortable.

This pulsation stems from the generation of a positive torque in the torque sensor 30. For this reason, even if the lower limit value of the duty ratio is set at 5%, the pulsation cannot be prevented.

By processes in steps S211, S213 to S217, the automatic transmission apparatus 1 for a vehicle of the second embodiment prevents the pulsation from taking place.

In step S211, in a case where the detected value of the torque sensor 30 is less than 0.2 N·m, and where the duty ratio of the motor M is 5% (Y), the flow proceeds to step S213.

In step S213, a value equal to "1" is assigned to Count, the value of the counter. In step S215, whether the value of the counter is larger than "20" is determined (whether a certain period of time has elapsed is determined). In a case where the value of the counter is not larger than "20," the flow proceeds to step S217. In a case where the value of the counter is larger than "20," the flow proceeds to step S216.

In a case where the shift lever 11 turns to the right (see FIG. 1), where the gate pin 15 hits the wall 13Aa of the recessed portion 13A of the position gate 13, and where the operator holds down the shift lever 11 with his/her hand, the flow in steps S100 to S104 is executed. Then, by the turning of the shift lever 11, the flow in step S206 is executed. Thereafter, a series of processes in steps S101, S102, S108, S109, S210, S211, S214 and S217 is repeated to the point where the detected value of the torque sensor 30 is lower than 0.2 N·m, and where the duty ratio of the motor M is 5%. In other words, the execution of a proportional control of the power assist continues to the point where the detected value of the torque sensor 30 is lower than 0.2 N·m, and where the duty ratio of the motor M is 5%.

The gate pin 15 of the shift lever 11 hits the wall 13Aa of the recessed portion 13A of the position gate 13, and thereby the turning of the shift lever 11 is restricted. As a result, the driving force of the motor M decreases, and the detected value of the torque sensor 30 is concurrently lowered. When the value of torque is lower than 0.2 N·m, and where the duty ratio of the motor 15 is concurrently 5%, it is determined as Y in step S211. As a result, a series of processes in steps S101, S102, S108, S109, S210, S211, S213, S215 and S217 is repeated until the value of the counter exceeds "20."

Once the value of the counter exceeds "20", it is determined as Y in step S215, and the flow then proceeds to step S216.

In step S216, a value Stop is assigned to a variable State, and the operation of the motor drive circuit 49 is stopped. A value zero is assigned to a variable Delay, and a value zero is also assigned to the value of the counter. Then, the flow proceeds to step S101.

The stopping of the motor drive circuit 49 causes the driving of the motor M to be stopped. Nevertheless, since the duty ratio of the motor M is set at 5%, the driving of the motor M is not completely stopped, but is driven slightly. The motor M continues to be driven for a period of time. Specifically, the driving of the motor M continues from the point where the value of the torque sensor 30 is lower than 0.2 N·m, and where the duty ratio of the motor M is 5%, to the point where the motor M is stopped, that is, to the point where the value of the counter is "20" (200 ms in total in a case where each of the processing time in a corresponding one of steps S101, S102, S108, S109, S210, S211, S213, S215, and S217 is, for example, 10 ms). Thus, the balance is not lost immediately after the motor M stops, and the value of the torque sensor 30 is prevented from being a high positive value which exceeds the threshold value.

In a case where the operator holds down the shift lever 11 with his/her hand in a state where the gate pin 15 is pressed against the wall 13Aa of the recessed portion 13A of the position gate 13, the motor M is stopped without generating a pulsation of force used for the power-assist.

Also in a case where the operator holds down the shift lever 11 with his/her hand in a state where the gate pin 15 of the shift lever 11 is pressed against the walls of the other recessed portions 13B and 13b of the position gate 13, the motor M is stopped without generating a pulsation of force used for the power-assist.

It is supposed that the shift lever 11 turns to the opposite direction (to the left in FIG. 1), that the gate pin 15 is pressed against the walls of the recessed portions 13A, 13B and 13b of the position gate 13, and that the operator holds down the shift lever 11 with his/her hand. In such a case, it is determined as Y in step S105, the flow in the step S207 and S108 is executed. In step S108, it is determined as Y, and the flow proceeds to the step S220.

In step S220, it is determined whether the shift lever 11 has reached the position where a brake control starts. This determination is carried out by determining whether a variable Pos exceeds a value BrakeLP[Position] representing the position where a brake operation starts in a direction from L to P.

In a case where it is determined that a variable Pos>BrakeLP[Position] (Y) in step S220, the flow proceeds to step S222. In a case where it is determined that it is not the case (N), the flow proceeds to step S221.

In step S222, a value LP_Brake is assigned to a variable State, the upper limit value of the duty ratio is cancelled. Then, the flow proceeds to step S101. Note that the upper limit value of duty ratio may be changed to a positive value, instead of being cancelled.

In step S221, a determination is carried out as to whether the detected value of the torque sensor 30 exceeds −0.2 N·m, and whether the motor M is driven at a duty ratio of −5%. In a case where it is determined that it is not the case (N), the flow proceeds to step S223. In a case where it is determined that it is the case (Y), the flow proceeds to step S224.

In step S223, the value of the counter is set at zero. In step S226, the motor drive circuit 49 is turned ON, and a proportional control of power assist is executed. Then, the flow proceeds to step S101.

In a case where the shift lever 11 turns to the right (in FIG. 1), when the shift lever 11 has not turned enough to reach the position where a brake control starts, it is determined as N in step S220, and is determined as N in step S221. Subsequently, the flow in step S223 is executed, and a power-assist control is executed in step S226. Then, the flow proceeds to step S101. For example, in a case where the shift lever 11 is being operated to be moved from the position N to the position R, when the shift lever 11 has not passed the position equivalent to 70% of the distance between the positions R and N, it is determined as N both in step S220 and in step S221.

Accordingly, in a case where the detent pin 62 has not ridden over the cam peak 61A of the detent plate 61, that is, in a case where a larger force is needed for operating the shift lever 11, the processing in each of the steps S220, S221, S223 and S226 is executed repeatedly. The processing is repeated until the detent pin 62 rides over the cam peak 61A. In this way, a power assist is carried out appropriately.

Once the detent pin 62 has ridden over the cam peak 61A of the detent plate 61, the detent pin 62 is pulled into the valley portion 61b of the detent plate 61, and thus the shift lever 11 accelerates toward the next position. In order to curb the acceleration of the shift lever 11, the motor M generates a positive driving force, and carries out a brake control.

In a case where the detent pin 62 has ridden over the cam peak 61A of the detent plate 61, it is determined as Y in step S210. Additionally, in step S212, a value PL_Brake is assigned to a value State, and the lower limit value of the duty ratio of the motor drive circuit 49 is cancelled. This canceling of the lower limit value allows the motor M to generate a negative driving force, so that the brake control is carried out.

In step S211, in a case where the detected value of the torque sensor 30 exceeds −0.2 N·m, and where the duty ratio of the motor M is −5% (Y), the flow proceeds to step S224.

In step S224, a value equal to "1" is assigned to the value of the counter. In step S215, whether the value of the counter is larger than "20" is determined (whether a certain period of time has elapsed is determined). In a case where the value of the counter is larger than "20," the flow proceeds to step S227. In a case where the value of the counter is not larger than "20," the flow proceeds to step S226.

It is suppose that the shift lever 11 turns to the left (see FIG. 1), that the gate pin 15 is in contact with the wall of the recessed portion 13B of the position gate 13, and that the operator holds down the shift lever 11 with his/her hand. In such a case, the flow in steps S100 to S104 is executed. Then, by the turning of the shift lever 11, the flow in step S207 is executed. Thereafter, a series of processes in steps S101, S102, S108, S220, S221, S224, and S226 is repeated to the point where the detected value of the torque sensor 30 exceeds −0.2 N·m, and where the duty ratio of the motor M is −5%. In other words, the execution of a proportional control of the power assist continues to the point where the detected value of the torque sensor 30 exceeds −0.2 N·m, and where the duty ratio of the motor M is −5%.

The gate pin 15 of the shift lever 11 hits the wall of the recessed portion 13B of the position gate 13, and the turning of the shift lever 11 is then restricted. Accordingly, the driving force of the motor M (or the absolute value thereof) decreases, and the detected value of the torque sensor 30 (or the absolute value thereof) is concurrently lowered. When the value of torque exceeds −0.2 N·m, and when the duty ratio of the motor 15 concurrently becomes −5%, it is determined as Y in step S221. As a result, a series of processes in steps S101, S102, S108, S109, S220, S221, S224, S225 and S226 is repeated until the value of the counter exceeds "20."

Once the value of the counter exceeds "20", it is determined as Y in step S225, and the flow then proceeds to step S227.

In step S227, a value Stop is assigned to a variable State, and the operation of the motor drive circuit 49 is stopped. A value zero is assigned to a variable Delay, and a value zero is also assigned to the value of the counter. Then, the flow proceeds to step S101. The flow in steps S101, S102, S108, and S220 to S227 is executed. As a result, the motor M can be stopped without generating pulsation.

Explanations will be given here of a case where the detent pin 62 has ridden over the cam peak 61A of the detent plate 61 at the time when the shift lever 11 turns.

In such a case, it is determined as Y in step S210. Additionally, in step S212, a value PL_Brake is assigned to a value State. When the flow then proceeds to step S101, it is determined as N in each of steps S102, S108 and S109. Thereafter, the flow proceeds to step S230.

In step S230, whether the value State is LP_Brake is determined. In a case where it is the case (Y), the flow proceeds to step S240. In a case where it is not the case (N), the flow proceeds to step S231.

In step S231, whether the value State is PL_Brake is determined. In a case where it is the case, the flow proceeds to step S232. In a case where it is not the case, the flow proceeds to step S101.

In step S232, according to the shift-position signal of the potentiometer 41, a determination is carried out as to whether the shift lever 11 has passed the positions equivalent to 60%, 60%, 60% and 90%, respectively, of the distances between positions P and R, R and N, N and D, and D and L. In other words, whether the variable Pos>StopPL[Position] is determined. Here, the reason why the distance between positions D and L is longer than the other distances is that the gate pin 15 is restricted between ranges D and L by position gate 13. In a case where the variable Pos>StopPL[Position], the flow proceeds to step S234. Otherwise, the flow proceeds to step S233.

In step S234, a value Stop is assigned to the variable State. The operation of the motor drive circuit 49 is stopped, and the power-assist control on the shift lever 11 is then stopped. A value zero is assigned to a variable Delay. Then, the flow proceeds to step S101.

In step S233, a determination is carried out as to whether the shift lever 11 has resumed the back position BackPL [Position]. In other words, a determination is carried out as to whether the shift lever 11 has been returned more than 30%, 30%, 30% and 65% respectively from the positions P, R, N, D, and L where the motor M is stopped (FIG. 12(A)). In a case where the variable Pos<BackPL[Position], the flow proceeds to step S235. Otherwise, the flow proceeds to step S236.

In step S235, a value PL_Assist is assigned to the variable State, and the lower limit value of the duty ratio of the motor drive circuit 49 is set at 5%. Then, the flow proceeds to step S101. In step S235, the shift lever 11 has resumed a certain predetermined position, that is, the detent pin 62 has resumed the state where the detent pin 62 was before the detent pin 62 has ridden over the cam peak 61A of the detent plate 61. For this reason, another power-assist control is carried out.

In step S236, the detent pin 62 has ridden over the cam peak 61A of the detent plate 61, but the shift lever 11 has not reached the position where the motor M is stopped. In other words, the detent pin 62 which has ridden over the cam peak 61A of the detent plate 61 is in the course of heading to the valley portion 61b. For this reason, a brake control by the motor M is carried out to prevent the shift lever 11 from accelerating toward the next position.

In a case where the shift lever 11 turns to move from the position L side to the position P side, a value LP_Brake is assigned to the variable State in step S222. Thus, it is determined as Y in step S230, and the processes in steps S240 to S244 are executed.

In step S240, according to the shift-position signal of the potentiometer 41, a determination is carried out as to whether the shift lever 11 goes past the positions equivalent to 80%, 90%, 80% and 80% respectively of the distances between the positions P and R, R and N, N and D, and D and L. In other words, whether the variable Pos>StopLP[Position] is determined. In a case where the variable Pos>StopLP[Position], the flow proceeds to step S244. Otherwise, the flow proceeds to step S241.

In step S241, a value Stop is assigned to the variable State. The operation of the motor drive circuit 49 is stopped, and the power-assist control on the shift lever 11 is stopped. A value zero is assigned to a variable Delay. Then, the flow proceeds to step S101.

In step S241, a determination is carried out as to whether the shift lever 11 has resumed the back position BackLP [Position]. In other words, a determination is carried out as to whether the shift lever 11 has been returned to a position equal to, or higher than, 30%, 65%, 30% and 65% respectively from the positions P, R, N, D, and L where the motor M is stopped (FIG. 12(B)). In a case where the variable Pos<BackPL[Position], the flow proceeds to step S243. Otherwise, the flow proceeds to step S242.

In step 243, a value LP_Assist is assigned to the variable State, and the higher limit value of the duty ratio of the motor drive circuit 49 is set at −5%. Then, the flow proceeds to step S101. In step S243, the shift lever 11 has resumed a certain predetermined position, that is, the detent pin 62 has resumed the state at the time before the detent pin 62 has ridden over the cam peak 61A of the detent plate 61. For this reason, another power-assist control is carried out.

In step S242, the detent pin 62 has ridden over the cam peak 61A of the detent plate 61, but the shift lever 11 has not reached the position where the motor M is stopped. In other words, the detent pin 62 which has ridden over the cam peak 61A of the detent plate 61 is in the course of heading to the valley portion 61b. For this reason, a brake control by the motor M is carried out to prevent the shift lever 11 from accelerating toward the next position.

Figure 11A:
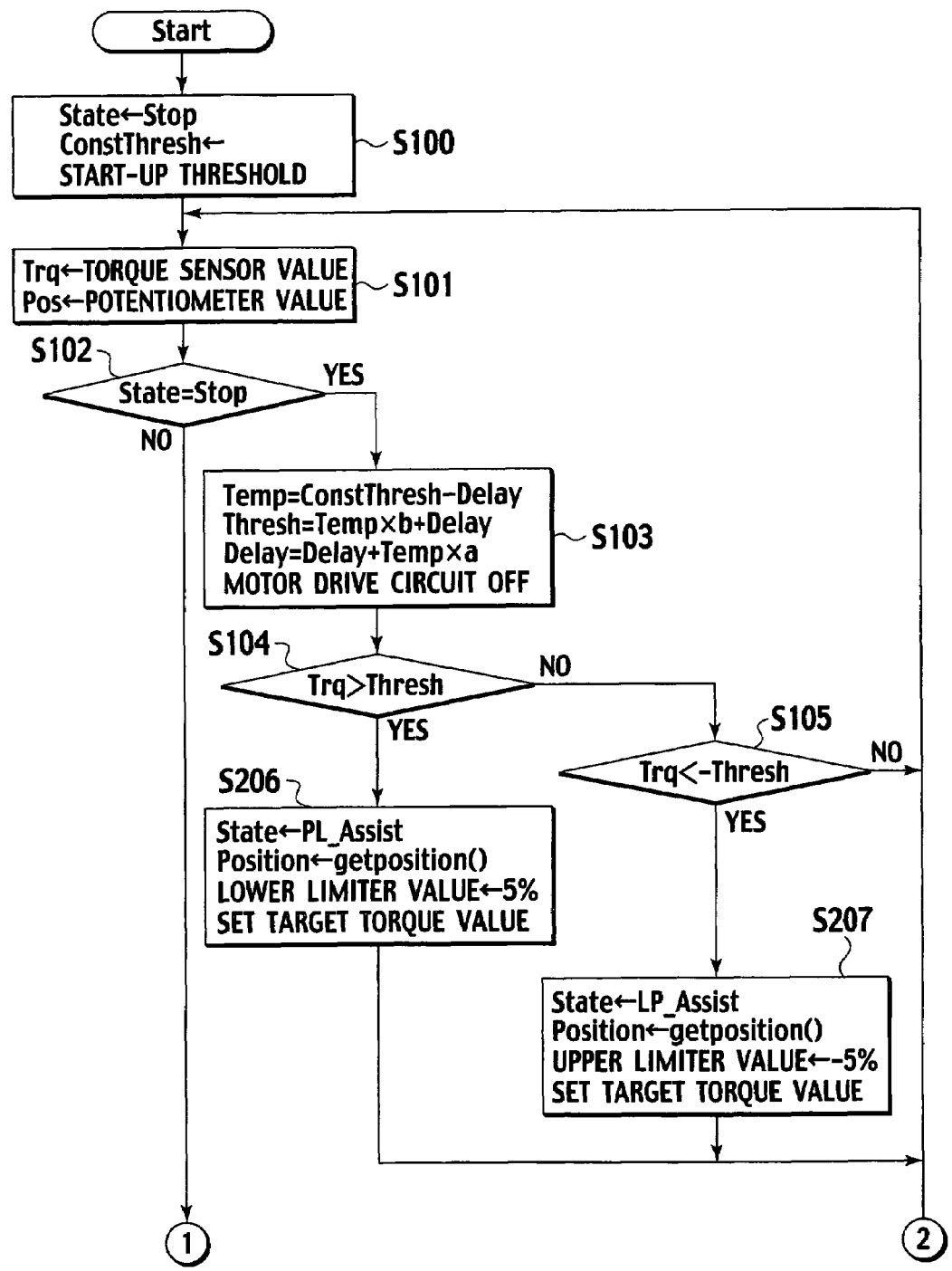
FIG. 11A is a control flow chart of the control unit of FIG. 10.
Figure 11B:
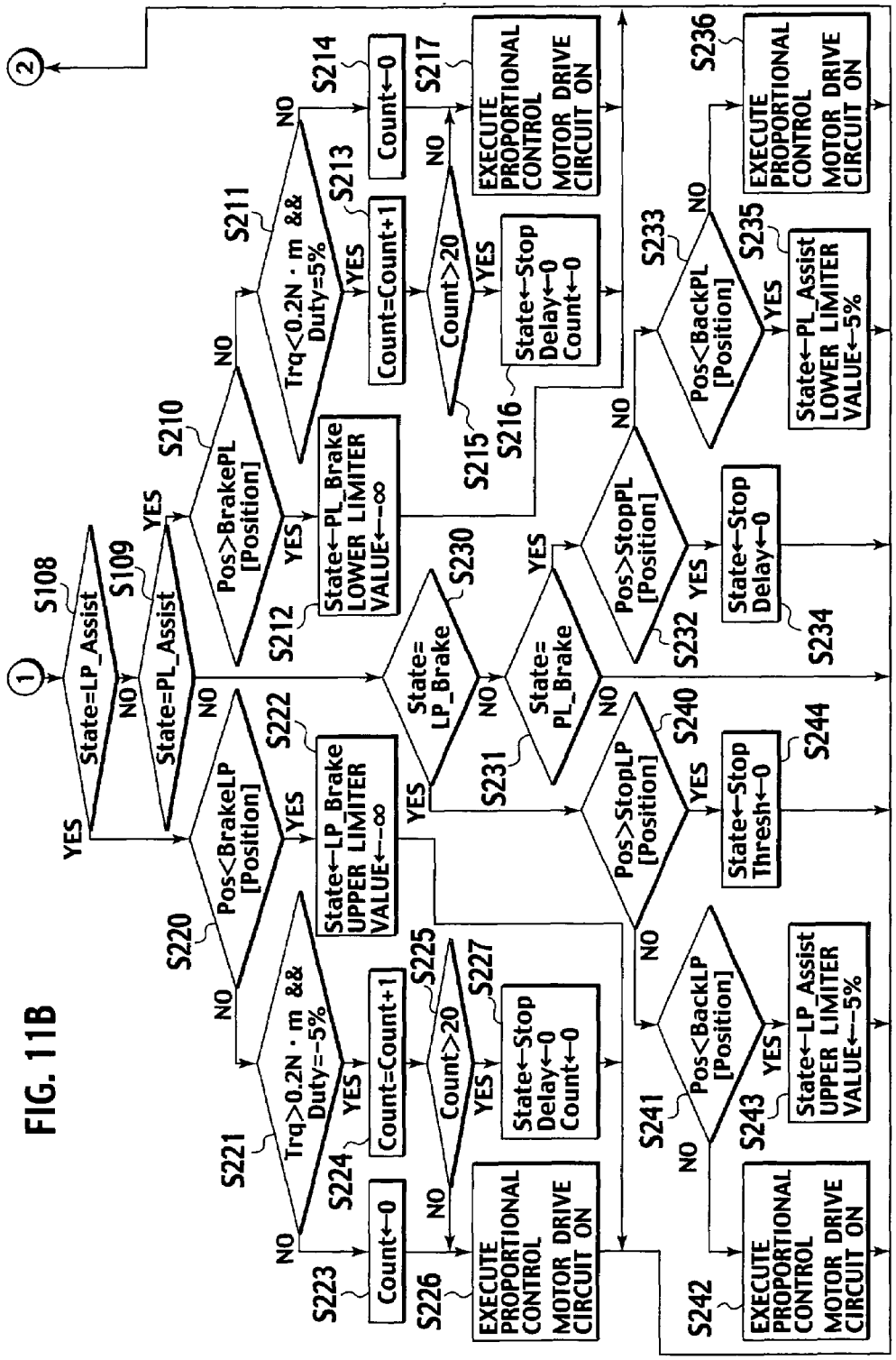
FIG. 11B is a control flow chart of the control unit of FIG. 10.
Figure 13:
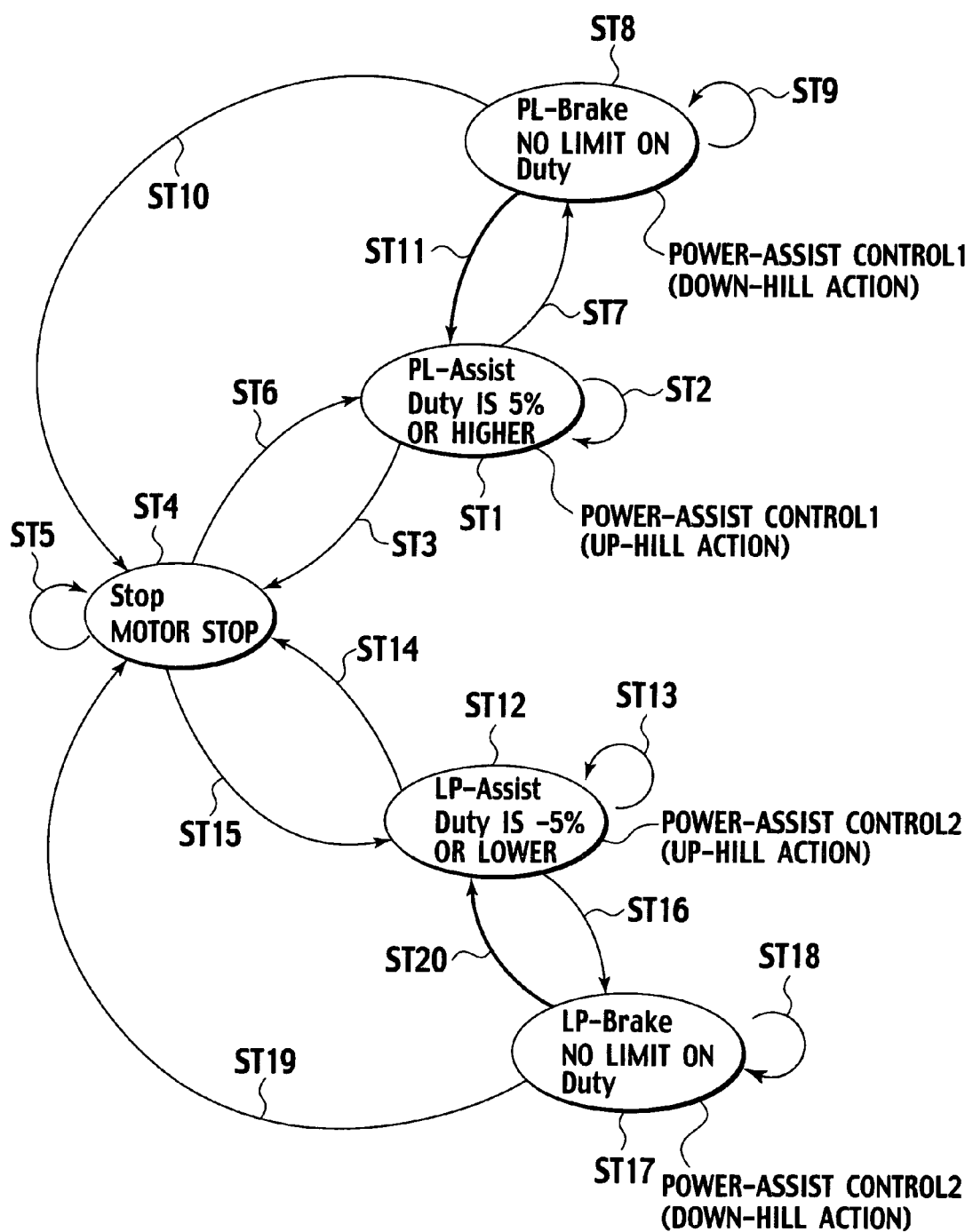
FIG. 13 is a state-transition diagram of the power-assist control of the control unit of FIG. 10.

FIG. 13 schematically illustrates the transition state of the control of the control flow chart shown in FIGS. 11A and 11B. In the power-assist control (power-assist control 1 (up-hill action) in FIG. 13), a value PL_Assist is assigned to the variable State, and the duty ratio is equal to, or higher than, 5% (ST1). In this state, the motor M is controlled with a computed target torque (ST2). When a certain period of time passes in a state where the torque is lowered to less than 0.2 N·m, and where the duty ratio is at the lower limit value (ST3), the motor M is stopped (ST4). After that, the state in which the motor is at rest continues (ST5). Here, when a certain actuating condition is fulfilled (ST6), the state of power-assist control (ST1) is restored.

Meanwhile, it is supposed that, in a state of power-assist control, the detent pin 62 climbs down the cam peak 61A, that is, for example, the shift lever 11 goes past the position equivalent to 50% or higher of the distance between ranges (ST7). In such a case, a value PL_Brake is assigned to the variable State, and the limit on the duty ratio is released, resulting in a brake control (power-assist control 1 (down-hill action) in FIG. 13) state (ST8). In this state, the motor M is controlled with a computed target torque (ST9).

In this state, in a case where the shift lever 11 reaches a position where a stop control of the motor M is carried out, that is, for example, in a case where the shift lever 11 goes past the position equivalent to 80% of the distance between ranges (ST10), the motor M is stopped (ST4). Alternatively, in that state (ST8), in a case where the shift lever 11 is returned to a position equal to, or more than, 30% of the distance between ranges (ST11), and, for example, it is determined as "No" in step S233, the state of power-assist control (ST1) is restored.

Similarly, in a power-assist control (power-assist control 2 (up-hill action) in FIG. 13), a value LP_Assist is assigned to the variable State, and the duty ratio is made equal to, or lower than, 5% (ST12). In this state, the motor M is controlled with a computed target torque (ST13). When a certain period of time passes in a state where the torque exceeds −0.2 N·m, and where the duty ratio is at the upper limit value (ST14), the motor M is stopped (ST4). After that, the state in which the motor M is at rest continues (ST5). Here, when a certain actuating condition is fulfilled (ST15), the state of power-assist control (ST11) is restored.

Meanwhile, it is supposed that, in a state of power-assist control, the detent pin 62 climbs down the cam peak 61A, that is, for example, the shift lever 11 goes past the position equivalent to 50% of the distance between ranges (ST16). In such a case, a value LP_Brake is assigned to the variable State, and the limit on the duty ratio is cancelled, resulting in a brake control (power-assist control 2 (down-hill action) in FIG. 13) state (ST17). In this state, the motor M is controlled with a computed target torque (ST18).

In this state, in a case where the shift lever 11 reaches a position where a stop control of the motor M is carried out, that is, for example, in a case where the shift lever 11 goes past the position equivalent to 80% of the distance between ranges (ST19), the motor M is stopped (ST4). Alternatively, in that state (ST17), in a case where the shift lever 11 is returned to a position equal to, or more than, 30% of the distance between ranges (ST20), and, for example, where it is determined as "No" in step S241, the state of power-assist control (ST1) is restored.

Figure 14A:
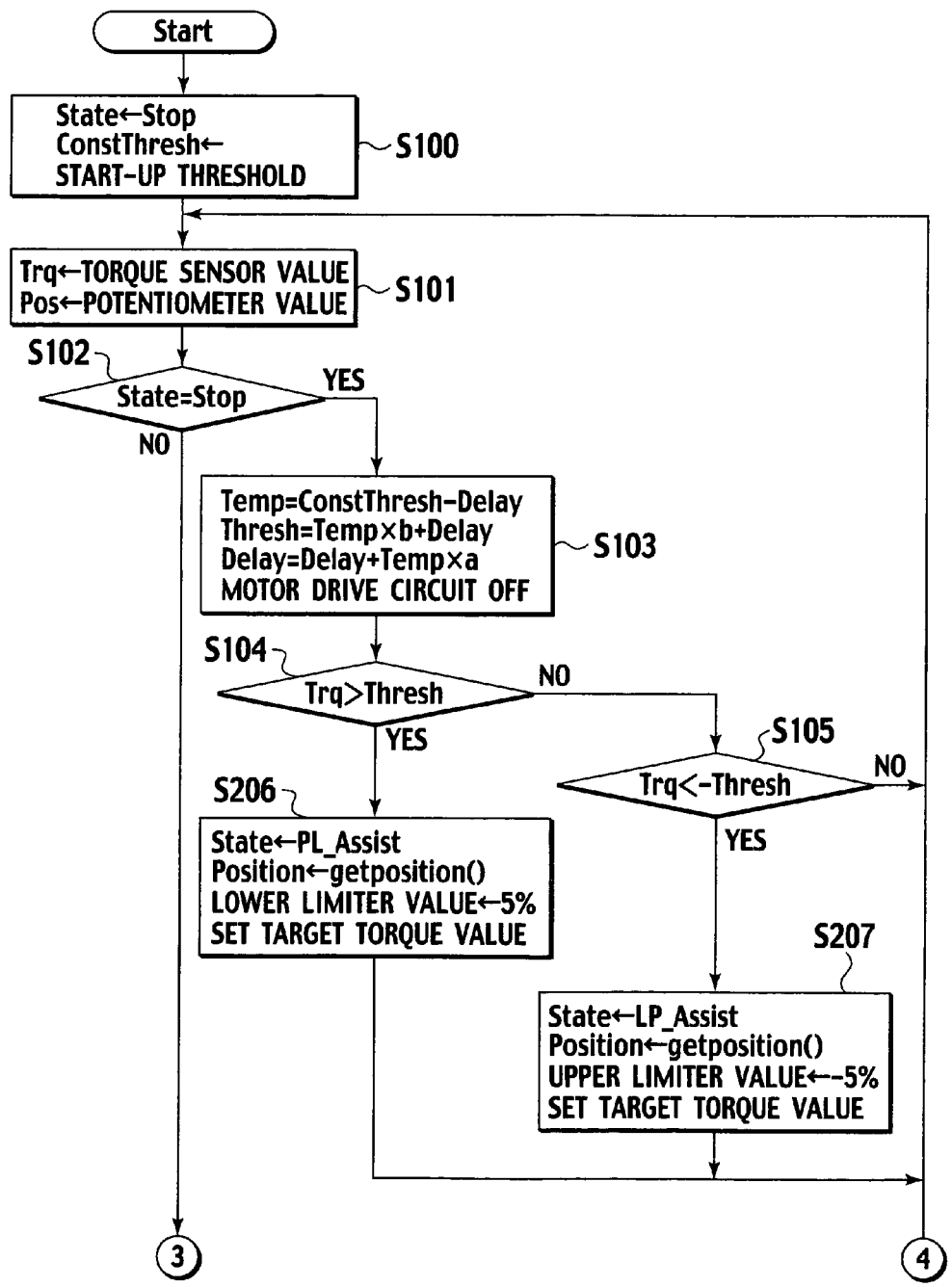
FIG. 14A is a control flow chart of an automatic transmission apparatus for a vehicle of a modified example of the second embodiment.
Figure 14B:
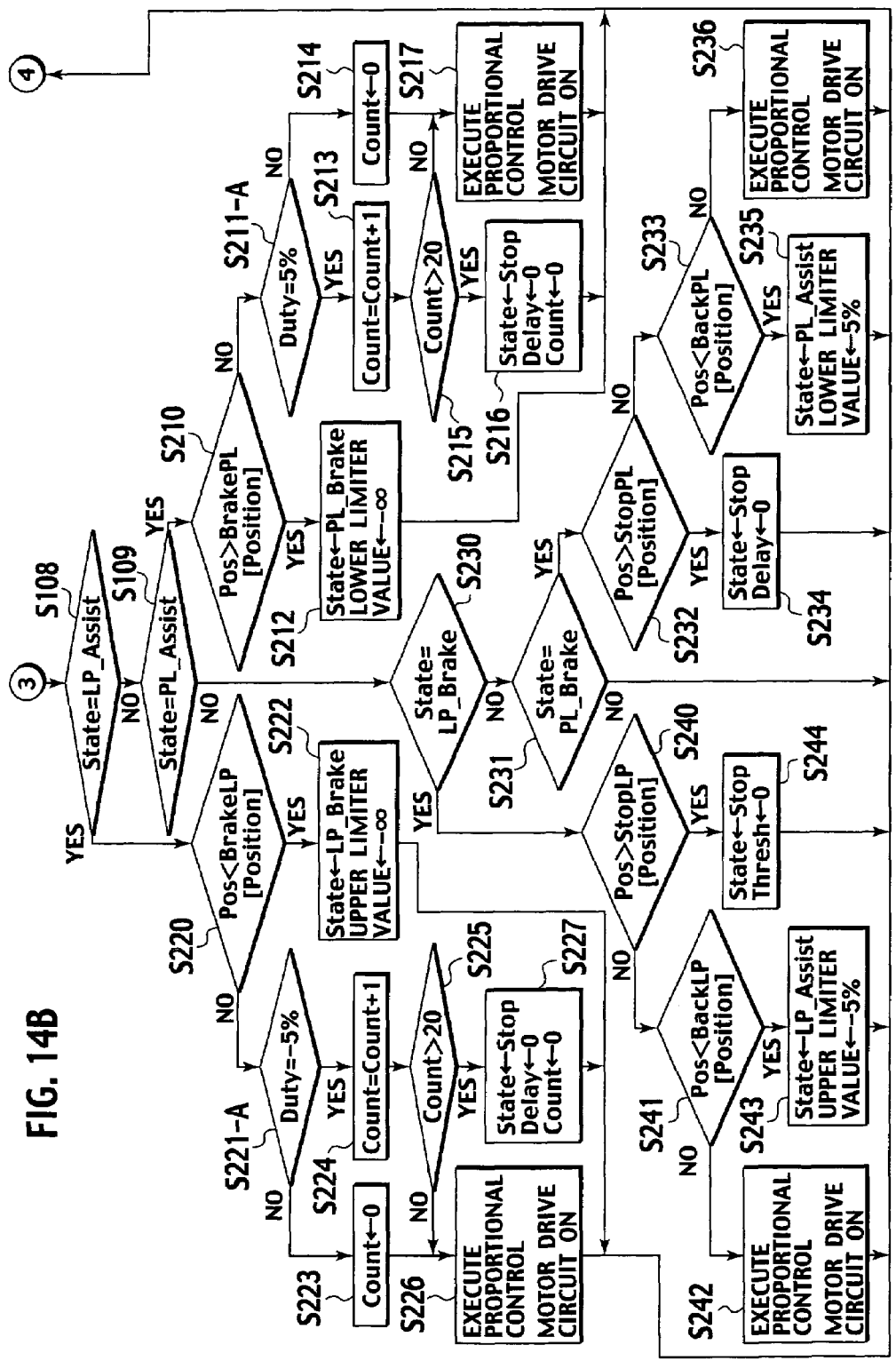
FIG. 14B is a control flow chart of the automatic transmission apparatus for a vehicle of the modified example of the second embodiment.

FIGS. 14A and 14B respectively show control flow charts of an automatic transmission apparatus for a vehicle of a modified example of the second embodiment. In step S211-A of this control flow chart, whether the duty ratio of the motor M is 5% is determined. In step S221-A, it is determined whether a processing with the positive and the negative effects reversed is carried out, that is, whether the duty ratio of the motor M is −5%.

In a case where the target torque value is lower than the variable ConstThresh, that is, where the target torque value is lower than the start-up threshold value, processes of this flow chart are executed. In a situation in which the duty ratio of the motor M is 5%, (the detected value of the torque sensor 30)<(target torque value). In a case of (the target torque value)<(the start-up threshold value), then (the detected value of the torque sensor 30)<(the start-up threshold value) holds true. For this reason, even though the power-assist control is stopped according to a determination based only on the duty ratio of the motor M in step S211-A, the power-assist control does not begin immediately after that. These processes above may be applicable to S221-A as well.

The other steps are the same as those in FIGS. 11A and 11B. Thus, the explanations are omitted.

Third Embodiment

Figure 15A:
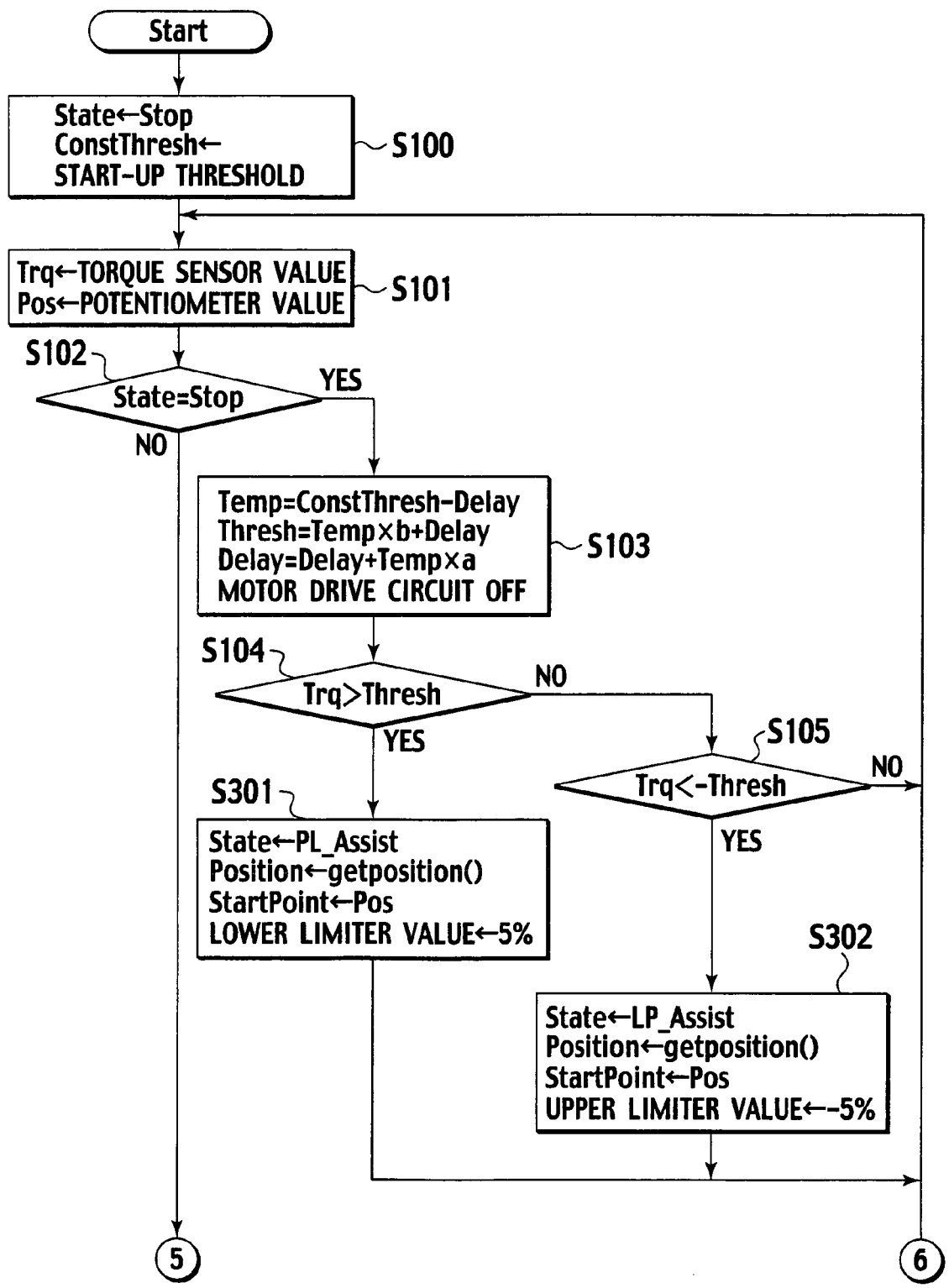
FIG. 15A is a control flow chart of an automatic transmission apparatus for a vehicle of a third embodiment.
Figure 15B:
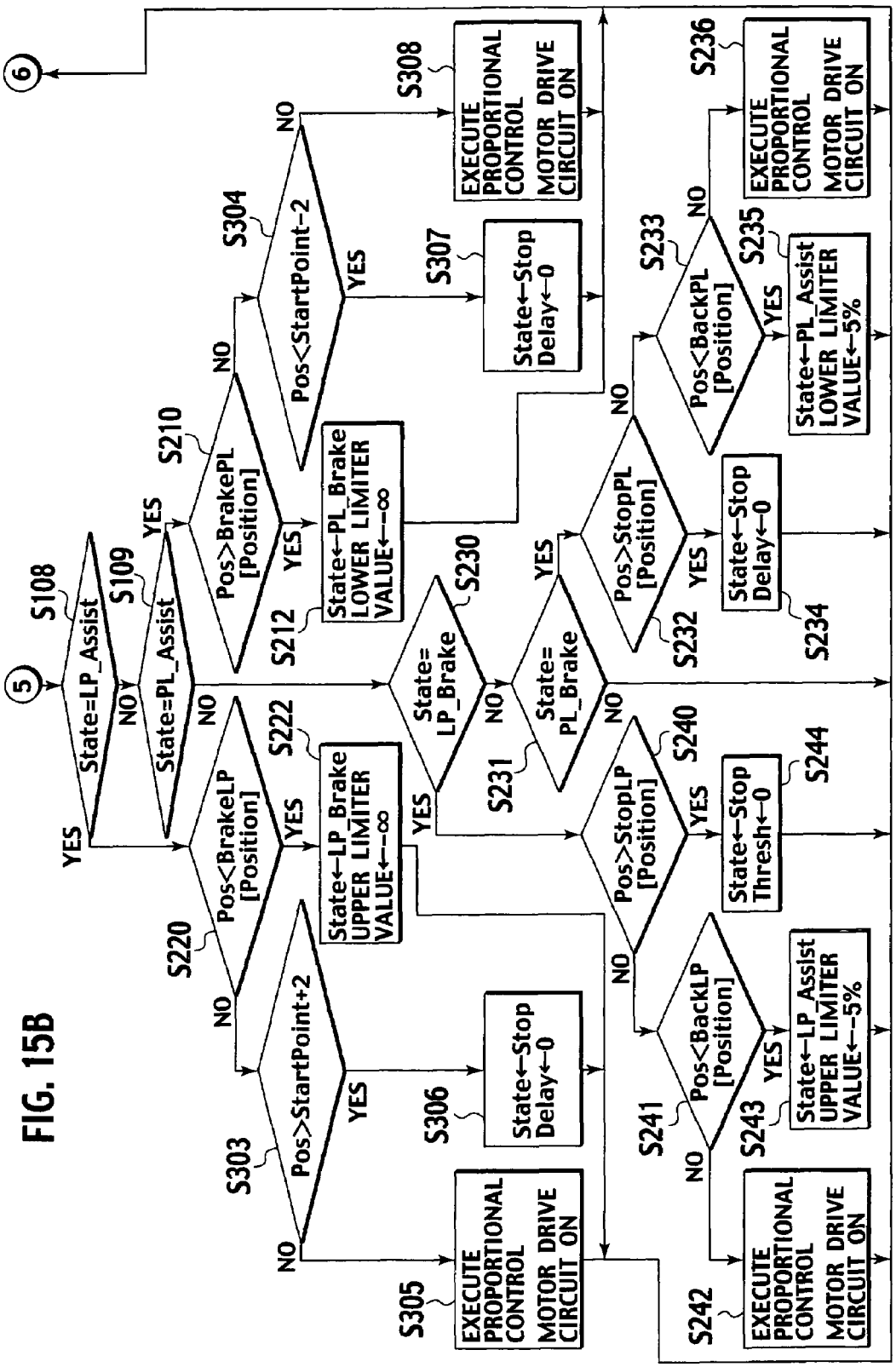
FIG. 15B is a control flow chart of the automatic transmission apparatus for a vehicle of the third embodiment.

FIGS. 15A and 15B respectively show a control flow chart of a controller unit 140 of a third embodiment. In step S301, a value PL_Assist is assigned to a variable State. The shift position (i.e., the position P, R, N, D or L) of a shift lever 11 is obtained according to a shift position signal of a potentiometer 41. A value getposition( ) corresponding to this shift position is assigned to a variable Position. In addition, a value of shift-position signal of the potentiometer 41 is assigned to a variable StartPoint which represents a position of the shift lever 11 at the time when the power assist starts, and the lower limit value of the duty ratio of a motor drive circuit 49 is set at 5%. The control unit 140 stores the position of the shift lever 11 at the time of starting the power-assist control by assigning a value of the shift position signal of the potentiometer 41 to the variable StartPoint.

In step S302, a value LP_Assist is assigned to a variable State. The shift position (i.e., the position P, R, N, D or L) of a shift lever 11 is obtained according to the shift position signal of a potentiometer 41. A value getposition( ) corresponding to this shift position is assigned to a variable Position. In addition, a value of shift-position signal of the potentiometer 41 is assigned to a variable StartPoint, and the upper limit value of the duty ratio of a motor drive circuit 49 is set at −5%. The control unit 40 stores the position of the shift lever 11 at the time of starting the power-assist control by assigning a value of the shift position signal of the potentiometer to the variable StartPoint.

In step S304, the current position of the shift lever 11 is compared with the position where the power assist of the shift lever 11 starts. Then, whether the shift lever 11 is returned by a certain predetermined amount (power-assist start point StartPoint-2) is determined. In a case where the shift lever is returned by the certain predetermined amount, the flow proceeds to step S307. Otherwise, the flow proceeds to step S308.

In step S307, a value Stop is assigned to the variable State. The operation of the motor drive circuit 49 is then stopped. A value zero is assigned to a variable Delay. Then, the flow proceeds to step S101.

In step S308, a proportional control of power assist is executed, and the flow proceeds to step S101.

The flow in each of the steps S303, S305 and S306 is similar to that in each of the steps S304, S307 and S308, respectively. Hence, explanations thereof are omitted. Explanations of other flows are omitted because these are similar to the flows which been described above.

Figure 16:
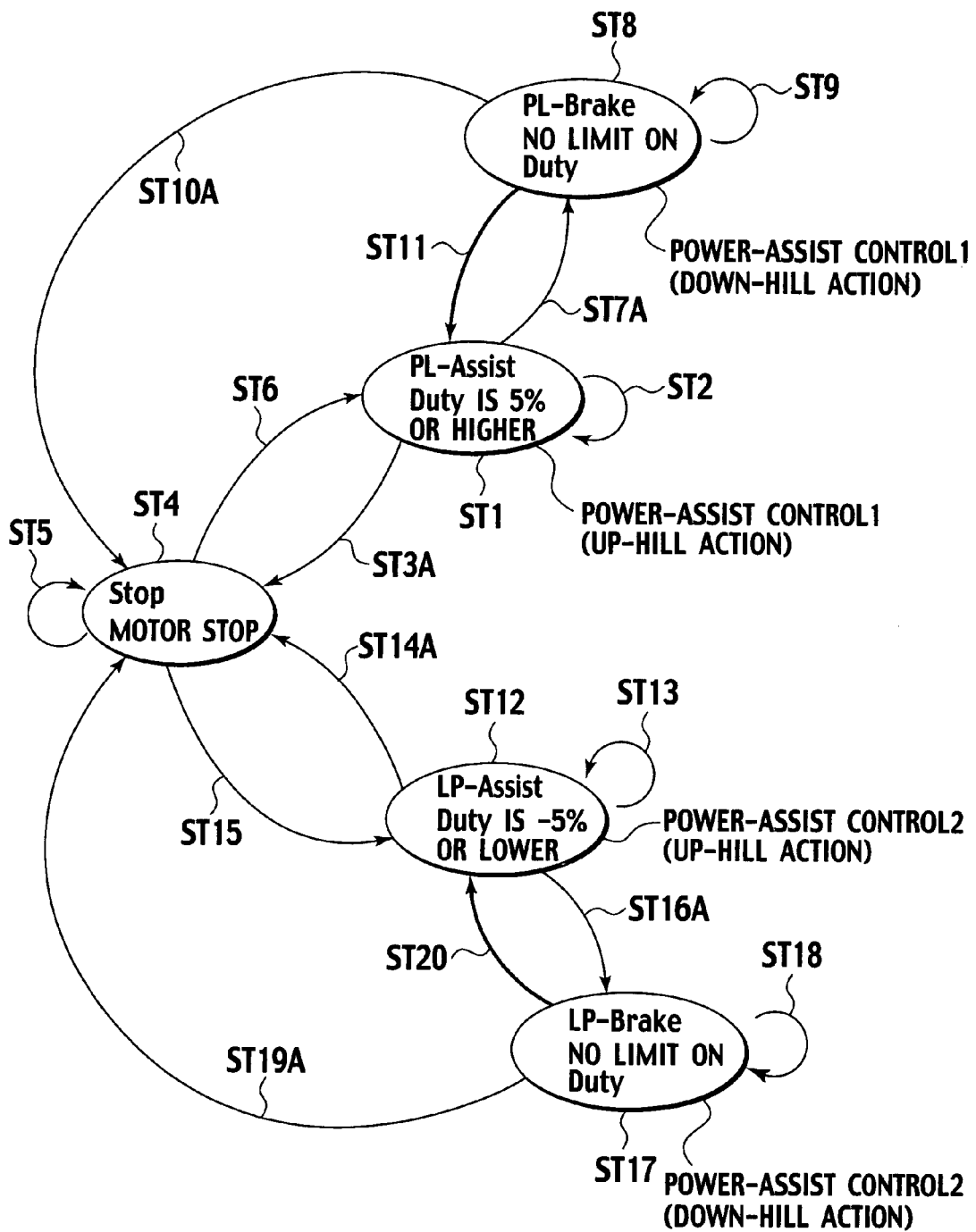
FIG. 16 is a state-transition diagram of the power-assist control of the automatic transmission apparatus for a vehicle of the third embodiment.

FIG. 16 is a state-transition diagram of a control of an automatic transmission apparatus for a vehicle of the third embodiment. In FIG. 16, states or ways of transition identical to those in FIGS. 14A and 14B are respectively given identical reference numerals, and explanations thereof are omitted.

In a state where a power-assist control is being carried out (ST1), when the shift lever 11 is moved in a direction opposite to the power-assist direction beyond the initial position thereof where the power-assist control begins (ST3A), a motor M is stopped (ST4).

It is supposed that, in a state where a power-assist control (ST1) is being carried out, a detent pin 62 descends a cam peak 61A, that is, for example, the shift lever 11 goes past the position equivalent to 40% of the distance between ranges (ST7A). In such a case, the power-assist-control state (ST1) is changed to a state where a brake control (power-assist control 1 (down-hill action) in FIG. 13) is being carried out (ST8).

In this state, the shift lever 11 has supposedly reached the position where a stop control on the motor M should be carry out, that is, for example, the shift lever 11 goes past the position equivalent to 60% of the distance between ranges (ST10A) In such a case, the motor M is stopped (ST4).

In a state where a power-assist control is being carried out (ST12), when the shift lever 11 is moved in a direction opposite to the power-assist direction beyond the initial position thereof where the power-assist control begins (ST14A), a motor M is stopped (ST4).

It is supposed that, in a state where a power-assist control (ST12) is being carried out, a detent pin 62 descends a cam peak 61A, that is, for example, the shift lever 11 goes past the position equivalent to 40% of the distance between ranges (ST7A). In such a case, the power-assist-control state (ST12) is changed to a state where a brake control (power-assist control 2 (down-hill action) in FIG. 13) is being carried out (ST8).

In this state, the shift lever 11 has supposedly reached the position where a stop control on the motor M should be carry out, that is, for example, the shift lever 11 goes past the position equivalent to 60% of the distance between ranges (ST19A). In such a case, the motor M is stopped (ST4).

The automatic transmission apparatus of the third embodiment can achieve similar effects to those achieved by the automatic transmission apparatus of the second embodiment. In the automatic transmission apparatus of the third embodiment, the power-assist control cannot be stopped except when the shift lever 11 is forcibly pulled back. For this reason, in a state where the shift lever 11 is thrust against a position gate 13, the power-assist control is not stopped. In contrast, with the shift lever 11 pulled back by a certain predetermined amount, the power-assist control is stopped, which results in a rapid power-assist control in an opposite direction.

Here, it takes 200 ms for the automatic transmission apparatus of the second embodiment to stop the power-assist control. The automatic transmission apparatus of the third embodiment, however, needs approximately zero second to carry out the stopping of the power-assist control. As a result, the operator feels less frequently that something is hung up in the transmission. In addition, the automatic transmission apparatus of the third embodiment stops the driving of the motor M when the shift lever 11 is pulled back by a certain predetermined amount. As a result, a change in the value of the potentiometer caused by noise, for example, does not stop the power-assist control, and the inappropriate stopping of the power-assist control can be avoided.

Note that the automatic transmission apparatus of the third embodiment stops the motor M when the shift lever 11 is pulled back by a certain predetermined amount irrespective of the position of the shift lever 11. However, such a predetermined amount may be varied for the automatic transmission apparatus of the third embodiment depending on the position of the shift lever 11. For example, the predetermined amount for a position which may possibly be restricted by the position gate 13 may be larger than the amount for other positions (may set the position closer to the next position).

For, example in the following case, the predetermined amount may be larger than the amounts for other positions. Specifically, it is supposed that the shift lever 11 is restricted by the position gate 13, and the shift lever 11 is pulled back slightly in the opposite direction. At this time, the detent pin 62 may be pulled into the valley portion 61b of the detent plate 61, a torque in the opposite direction may act on the torque sensor 30, and thus the shift lever 11 may move to the opposite direction. In a case where the above is possible, the predetermined amount may be larger than the amount for the other positions.

More specifically, the shift lever 11 is supposed moved from the position R toward the position P, and the gate pin 15 is restricted by the position gate 13. In this case, when the shift lever 11 is pulled back toward an original position by a certain predetermined amount, the motor M is stopped. With the motor M being stopped, even when the shift lever 11 is operated to move toward the position P, a power assist is carried out to move the shift lever 11 towards the position N. The power assist in such a direction is caused by a toque on a torque sensor 30 in a direction opposite to the operation direction, and the torque is generated by the detent pin 62 which is pulled into the valley portion 61b of the detent plate 61.

However, such a problem can be solved by setting the predetermined amount to be larger. The reason for this is as follows. The power assist is not stopped until the shift lever 11 is pulled back towards the position N by equal to or more than a certain predetermined amount. With a larger predetermined amount, even when the detent pin 62 is pulled into the valley portion of the detent plate 61 to generate a torque in the opposite direction, the movement of the shift lever 11 does not exceed the certain predetermined amount that has been set larger than before. Thus, no power assist to move the shift lever 11 towards the position N is carried out.

According to the embodiments described above, even when the shift lever 11 is operated to cause the detected value of the torque sensor 30 to be reversed to be positive or negative, the driving force of the motor M is restricted, and the rotating direction of the motor M is prevented from being reversed. Even when the shift lever 11 is operated without pressing the operation button 14, the vibration of the shift lever 11 within a recessed portion of the position gate 13 is prevented. In a case where the movement of the shift lever 11 is restricted, by the position gate 13, only to one direction, a power assist to move the shift lever 11 to the opposite direction is prevented.

While the shift lever 11 is held down by the operator, a pulsation phenomenon caused by the motor is prevented.

A motor pulsation phenomenon which occurs in a case where the detected signal value of the operation force detection means is abruptly changed is prevented from taking place. The abrupt change is caused by a reaction of the shift lever which occurs when the shift lever is operated quickly.

In a case where the gate pin 15 is thrust against the wall of the position gate 13, a pulsation phenomenon of the motor M is prevented from taking place.

Even when the shift lever 11 is operated quickly, and when the detected value of the torque sensor 30 changes rapidly, a pulsation phenomenon of the motor M is prevented from taking place.

In a case where the shift lever 11 is pulled back while the power-assist control is being carried out, the power-assist control can be stopped quickly. The power-assist control, if continued, would cause the operator to feel that something is hung up. The feeling, however, can be avoided by stopping the power-assist control.

At positions where the gate pin 15 is not restricted by the position gate 13, the driving power is not restricted, or the driving power is relaxed. As a result, an appropriate power-assist control can be carried out.

The present application claims priority to Japanese Patent Application No. 2004-200086, filed Jul. 7, 2004, and the entire contents thereof is incorporated herein by reference.

The preferable embodiments of the present invention have been described hereinbefore. The present invention, however, is not limited to the embodiments. It will be obvious to those skilled in the art that other variations and modifications may be made within the scope of the following claims.

The invention claimed is:

1. An automatic transmission apparatus for a vehicle, comprising:
a shift lever which is provided as being capable of being operated to move to a plurality of positions, wherein the shift lever is configured to switch ranges of an automatic transmission by being operated to move to each position;
a position gate configured to restrict the position of the shift lever, and is configured to release the restriction to allow the shift lever to change positions when an operation button provided on the shift lever is pressed;
an operation force detector configured to detect an operation force on the shift lever; and
a controller configured to determine whether a power-assist control is to be carried out according to a detected value of the operation force detector, and is configured to drive a motor to provide a power assist to help the operation of the shift lever in a case where the power-assist control is actually carried out,
wherein the controller is configured to set a lower limit of a driving force of the motor to a positive value near zero when the detected value of the operation force detector is greater than a predetermined positive threshold value, and to set an upper limit of the driving force of the motor to a negative value near zero when the detected value of the operation force detector is less than a predetermined negative threshold value, to prevent a reversal of the power-assist direction due to the detected value of the operation force detector being reversed to a positive value or a negative value, the reversal of the detected value of the operation force detector being caused in a case where the shift lever is operated without releasing the restriction by the position gate, and where the shift lever is then operated to hit the position gate.

2. The automatic transmission apparatus for a vehicle as recited in claim 1, wherein, in a case where the controller drives the motor and provides a power assist to move the shift lever to a next position, the power-assist control is configured to stop when the detected value of the operation force detector is near zero, and when the driving force of the motor is also near zero.

3. The automatic transmission apparatus for a vehicle as recited in claim 2, wherein, when a state in which the detected value of the operation force detector is near zero, and in which the driving force of the motor is also near zero, continues for a certain period of time, the controller is configured to stop the power-assist control.

4. The automatic transmission apparatus for a vehicle as recited in claim 1, further comprising a position detector configured to detect a shift position of the shift lever,
wherein the apparatus is configured such that:
when the detected value of the operation force detector exceeds a threshold value, the controller is configured to set a target value of the power-assist operation force according to the shift position of the shift lever which is detected by the position detector, and to drive the motor according to the target value of the power-assist operation force and to the detected value of the operation force detector; and
when the target value of the power-assist operation force is smaller than the threshold value, and when the driving force of the motor concurrently becomes near zero, the controller is configured to stop the power-assist control.

5. The automatic transmission apparatus for a vehicle as recited in claim 4, wherein, in a case where a state in which the driving force of the motor is near zero continues for a certain period of time, the controller is configured to stop the power-assist control.

6. The automatic transmission apparatus for a vehicle as recited in claim 1, wherein, in a case where the shift lever is pulled back from a position of the shift lever at the beginning of the power-assist control in a direction opposite to the power-assist direction at the time of the power-assist control by a certain predetermined amount, the controller is configured to stop the power-assist control.

7. The automatic transmission apparatus for a vehicle as recited in claim 1, further comprising a position detector configured to detect a shift position of the shift lever,
wherein the apparatus is configured such that:
when the detected value of the operation force detector exceeds a threshold value, the controller is configured to drive the motor,
when the shift position of the shift lever detected by the position detector is within a range which has been set in advance, the controller is configured to limit the driving force of the motor, and
when the shift position is outside a range which has been set in advance, the controller is configured to do any one of the releasing of the limit on the driving force and the changing of the limit value of the driving force.

8. The automatic transmission apparatus for a vehicle as recited in claim 7, wherein the controller is configured to change the range in response to the shift position of the shift lever detected by the position detector.

9. An automatic transmission method for a vehicle, comprising:
a first step of switching ranges of an automatic transmission by operating to move a shift lever which is provided as being capable of being operated to move to a plurality of positions, to each of the plurality of positions;
a second step of releasing a restriction by a position gate which restricts the position of the shift lever, allowing the shift lever to change positions when an operation button provided on the shift lever is pressed;
a third step of detecting the operation force on the shift lever; and
a fourth step of determining whether a power-assist control is to be carried out according to the detected value detected in the third step, and driving a motor to provide a power assist to help the operation of the shift lever in a case where the power-assist control is actually carried out,
wherein in the fourth step, a reversal of the power-assist direction, which is due to the detected value detected in the third step being reversed to a positive value or a negative value, is prevented by setting a lower limit of a driving force of the motor to a positive value near zero when the detected value detected in the third step is greater than a predetermined positive threshold value, and setting an upper limit of the driving force of the motor to a negative value near zero when the detected value detected in the third step is less than a predetermined negative threshold value, the reversal of the detected value being caused in a case where the shift lever is operated without releasing the restriction by the position gate, and where the shift lever is then operated to hit the position gate.

10. The automatic transmission method for a vehicle as recited in claim 9, wherein, in the fourth step, in a case where the motor is driven to provide a power assist to help the shift lever move to the next position, the power-assist control is stopped when the detected value detected in the third step is near zero, and when the driving force of the motor concurrently becomes near zero.

11. The automatic transmission method for a vehicle as recited in claim 10, wherein, in the fourth step, the power-assist control is stopped when a state in which the detected value detected in the third step is near zero, and in which the driving force of the motor is near zero, continues for a certain period of time.

12. The automatic transmission method for a vehicle as recited in claim 9, further comprising a fifth step of detecting the shift position of the shift lever,
wherein, in the fourth step:
when the detected value detected in the third step exceeds a threshold value, a target value of a power-assist-operation force is set according to the shift position of the shift lever detected in the fifth step, and the motor is driven according to the target value of the power-assist-operation force and to the detected value detected in the third step, and
when the target value of the power-assist-operation force is smaller than the threshold value, and when the driving force of the motor concurrently becomes near zero, the power-assist control is stopped.

13. The automatic transmission method for a vehicle as recited in claim 12, wherein, in the fourth step, in a case where a state in which the driving force of the motor is near zero continues for a certain period of time, the power-assist control is stopped.

14. The automatic transmission method for a vehicle as recited in claim 9, wherein, in the fourth step, in a case where the shift lever is pulled back from a position of the shift lever at the beginning of the power-assist control in a direction opposite to the power-assist direction by a certain predetermined amount, the power-assist control is stopped.

15. The automatic transmission method for a vehicle as recited in claim 9, further comprising a fifth step of detecting a shift position of the shift lever,
wherein, in the fourth step:
when the detected value detected in the third step exceeds a threshold value, the motor is driven, and
when the shift position of the shift lever detected in the fifth step is within a range which has been set in advance, the driving force of the motor is limited, and
when the shift position is outside a range which has been set in advance, any one of the releasing of the limit on the driving force and the changing of the limit value of the driving force is carried out.

16. The automatic transmission method for a vehicle as recited in claim 15, wherein, in the fourth step, the range is changed in response to the shift position of the shift lever detected in the fifth step.

17. An automatic transmission apparatus for a vehicle, comprising:
shift lever means, which is provided as being capable of being operated to move to a plurality of positions, for switching ranges of an automatic transmission by being operated to move to each position;
position gate means for restricting the position of the shift lever means, and for releasing the restriction to allow the shift lever means to change positions when an operation button provided on the shift lever means is pressed;
operation force detecting means for detecting no operation force on the shift lever means;
control means for determining whether a power-assist control is to be carried out according to a detected value of the operation force detecting means, and for driving a motor to provide a power assist to help the operation of the shift lever means in a case where the power-assist control is actually carried out,
wherein the control means sets a lower limit of a driving force of the motor to a positive value near zero when the detected value of the operation force detecting means is greater than a predetermined positive threshold value, and sets an upper limit of the driving force of the motor to a negative value near zero when the detected value of the operation force detecting means is less than a predetermined negative threshold value, to prevent a reversal of the power-assist direction due to the detected value of the operation force detecting means being reversed to a positive value or a negative value, the reversal of the detected value of the operation force detecting means being caused in a case where the shift lever means is operated without releasing the restriction by the position gate means, and where the shift lever means is then operated to hit the position gate means.

\* \* \* \* \*